(12) United States Patent
Jimenez-Marquez et al.

(10) Patent No.: US 11,297,853 B2
(45) Date of Patent: *Apr. 12, 2022

(54) PALATABLE EXPANDED FOOD PRODUCTS AND METHODS OF MANUFACTURE THEREOF

(71) Applicant: BIG HEART PET, INC., Orrville, OH (US)

(72) Inventors: Sergio A. Jimenez-Marquez, El Segundo, CA (US); Darin Y. Matsubara, Akron, OH (US); Adelmo Monsalve-Gonzalez, Lakeville, MN (US); Lina Pruitt, Laguna Niguel, CA (US)

(73) Assignee: BIG HEART PET, INC., Orrville, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/271,141

(22) Filed: Feb. 8, 2019

(65) Prior Publication Data

US 2019/0166883 A1 Jun. 6, 2019

Related U.S. Application Data

(63) Continuation of application No. 15/154,552, filed on May 13, 2016, now Pat. No. 10,244,777.

(60) Provisional application No. 62/162,683, filed on May 16, 2015.

(51) Int. Cl.
| | |
|---|---|
| A23K 10/00 | (2016.01) |
| A23K 20/00 | (2016.01) |
| A23K 50/00 | (2016.01) |
| A23L 27/00 | (2016.01) |
| A23K 50/42 | (2016.01) |
| A23K 10/30 | (2016.01) |
| A23K 20/174 | (2016.01) |
| A23K 20/20 | (2016.01) |
| A23K 20/179 | (2016.01) |
| A23K 20/189 | (2016.01) |
| A23K 10/18 | (2016.01) |
| A23K 40/25 | (2016.01) |
| A23K 40/30 | (2016.01) |
| A23K 10/26 | (2016.01) |
| A23K 20/163 | (2016.01) |

(52) U.S. Cl.
CPC ............ *A23K 50/42* (2016.05); *A23K 10/18* (2016.05); *A23K 10/26* (2016.05); *A23K 10/30* (2016.05); *A23K 20/163* (2016.05); *A23K 20/174* (2016.05); *A23K 20/179* (2016.05); *A23K 20/189* (2016.05); *A23K 20/20* (2016.05); *A23K 40/25* (2016.05); *A23K 40/30* (2016.05)

(58) Field of Classification Search
None
See application file for complete search history.

(56) References Cited

U.S. PATENT DOCUMENTS

| | | | |
|---|---|---|---|
| 2,295,868 A | 9/1942 | Schwebke et al. | |
| 4,517,204 A | 5/1985 | Mottur et al. | |
| 4,869,911 A | 9/1989 | Keller | |
| 5,120,565 A | 6/1992 | Lanter et al. | |
| 5,298,615 A | 3/1994 | Matsui et al. | |
| 5,527,553 A * | 6/1996 | Kazemzadeh | A23K 40/30 426/302 |
| 5,587,193 A | 12/1996 | Kazemzadeh | |
| 5,783,240 A | 7/1998 | Wenger et al. | |
| 5,968,569 A | 10/1999 | Cavadini et al. | |
| 6,022,574 A | 2/2000 | Lanner et al. | |
| 6,136,353 A | 10/2000 | Munz | |
| 6,153,242 A | 11/2000 | Miyamoto et al. | |

(Continued)

FOREIGN PATENT DOCUMENTS

| | | |
|---|---|---|
| CA | 2805500 | 2/2012 |
| CN | 104256072 | 1/2015 |

(Continued)

OTHER PUBLICATIONS

International Search Report and Written Opinion dated Aug. 18, 2016 in corresponding International Application No. PCT/US2016/032460.

Office Action/Restriction Requirement dated Nov. 21, 2016 in corresponding U.S. Appl. No. 15/154,552.

Amendment dated Jan. 23, 2017, filed in response to Office Action/Restriction Requirement dated Nov. 21, 2016 in corresponding U.S. Appl. No. 15/154,552.

Non-final Office Action dated Feb. 28, 2017 in corresponding U.S. Appl. No. 15/154,552.

(Continued)

*Primary Examiner* — Brian Gulledge
(74) *Attorney, Agent, or Firm* — Michael A. Olshavsky

(57) ABSTRACT

Palatable food products are provided with low bulk density of about 4-12 lb/ft³ and comprise an expanded matrix of intercommunicated pores defined by a skeletal structure of gelatinized starch. The products produce an audible crunch sound when crushed by applied force and include low calorie, energy-dense characteristics of about 2-6 Kcal/g. The total weight of the product comprises about 20-60% starch, about 30% or less flowable fat, about 2-12% water, and a coating of flavorants and/or aromants. The product can optionally comprise health promoting ingredients. The products are manufactured by extruding batched ingredients including starch and water under processing conditions to promote starch gelatinization to form a substantially homogenous dough that, after extrusion, expands into a porous matrix. The porous matrix can undergo vacuum infusion to fill the matrix with flowable fat, dry palatant, and wet palatant. After infusion, the porous matrix can be dust coated with dry palatant.

19 Claims, 21 Drawing Sheets
(4 of 21 Drawing Sheet(s) Filed in Color)

(56) References Cited

U.S. PATENT DOCUMENTS

| | | |
|---|---|---|
| 6,238,708 B1 | 5/2001 | Hayek et al. |
| 6,379,725 B1 | 4/2002 | Wang et al. |
| 6,440,473 B2 | 8/2002 | Geromini et al. |
| 6,440,477 B2 | 8/2002 | Nishioka et al. |
| 6,491,959 B1 | 12/2002 | Chiang et al. |
| 6,517,902 B2 | 2/2003 | Drake et al. |
| 6,517,903 B1 | 2/2003 | Schmidt |
| 6,586,031 B1 | 7/2003 | Kelly |
| 6,607,777 B1 | 8/2003 | Walsh et al. |
| 6,645,541 B2 | 11/2003 | Morii et al. |
| 6,780,449 B2 | 8/2004 | Razaa |
| 6,792,324 B2 | 9/2004 | Trinkel |
| 6,805,888 B2 | 10/2004 | Wu |
| 6,827,957 B2 | 12/2004 | Paluch et al. |
| 6,896,924 B2 | 5/2005 | Hernandez et al. |
| 6,991,819 B2 | 1/2006 | Pannevis et al. |
| 7,001,636 B1 | 2/2006 | Oddsen et al. |
| 7,141,257 B2 | 11/2006 | Malfait |
| 7,235,276 B2 | 6/2007 | Allen et al. |
| 7,288,275 B2 | 10/2007 | Axelrod et al. |
| 7,297,357 B2 | 11/2007 | Akimoto et al. |
| 7,479,294 B2 | 1/2009 | Sokhey et al. |
| 7,521,078 B2 | 4/2009 | Miller |
| 7,604,829 B2 | 10/2009 | Schopf et al. |
| 7,678,406 B2 | 3/2010 | Heydtmann et al. |
| 7,722,911 B2 | 5/2010 | Liu et al. |
| 7,879,377 B2 | 2/2011 | Dahl et al. |
| 8,062,685 B2 | 11/2011 | Anand et al. |
| 8,101,226 B2 | 1/2012 | Erdmann et al. |
| 8,137,731 B2 | 3/2012 | Pater et al. |
| 8,163,309 B2 | 4/2012 | Glenn et al. |
| 8,293,308 B2 | 10/2012 | Dautremont et al. |
| 8,293,317 B2 | 10/2012 | Fannon et al. |
| 8,349,342 B2 | 1/2013 | Lobee et al. |
| 8,496,985 B2 | 7/2013 | Langford |
| 8,563,065 B2 | 10/2013 | Zimeri et al. |
| 8,628,794 B2 | 1/2014 | Isele |
| 8,697,174 B2 | 4/2014 | Teconchuk et al. |
| 8,741,370 B2 | 6/2014 | Ganjyal et al. |
| 8,877,277 B2 | 11/2014 | Ganjyal |
| 8,945,660 B2 | 2/2015 | Cox et al. |
| 8,980,353 B2 | 3/2015 | Ashourian et al. |
| 8,999,409 B2 | 4/2015 | Deuerer |
| 9,032,798 B2 | 5/2015 | Sakakibara et al. |
| 10,244,777 B2 * | 4/2019 | Jimenez-Marquez ....................... A23K 50/42 |
| 2005/0058759 A1 | 3/2005 | Schmidt |
| 2009/0047400 A1 | 2/2009 | Basker et al. |
| 2009/0148560 A1 | 6/2009 | Shiba et al. |
| 2009/0280216 A1 | 11/2009 | Fumita |
| 2010/0028483 A1 | 2/2010 | Wasserfuhr et al. |
| 2010/0034925 A1 | 2/2010 | Pibarot et al. |
| 2010/0112147 A1 | 5/2010 | Barnard et al. |
| 2010/0233320 A1 | 9/2010 | Sunvold et al. |
| 2010/0303951 A1 | 12/2010 | Sunvold et al. |
| 2010/0303966 A1 | 12/2010 | Sunvold et al. |
| 2010/0303968 A1 | 12/2010 | Sunvold et al. |
| 2010/0303976 A1 | 12/2010 | Corrigan et al. |
| 2011/0104327 A1 | 5/2011 | Kirejevas |
| 2011/0171348 A1 | 7/2011 | Kirejevas |
| 2011/0274741 A1 | 11/2011 | Horton |
| 2012/0064209 A1 | 3/2012 | Ardisson-Korat et al. |
| 2012/0076895 A1 | 3/2012 | Kirejevas et al. |
| 2012/0171351 A1 | 7/2012 | Solorio |
| 2012/0263758 A1* | 10/2012 | Chinachoti ............ A23K 40/25 424/282.1 |
| 2013/0045317 A1 | 2/2013 | Ardisson-Korat et al. |
| 2013/0129865 A1 | 5/2013 | Goold et al. |
| 2013/0196033 A1 | 8/2013 | Anand et al. |
| 2013/0273219 A1 | 10/2013 | Baier et al. |
| 2013/0309384 A1 | 11/2013 | Villagran et al. |
| 2014/0010766 A1 | 1/2014 | Sleigh et al. |
| 2014/0113032 A1 | 4/2014 | Reiser et al. |
| 2014/0134306 A1 | 5/2014 | Sakaji et al. |
| 2014/0154366 A1 | 6/2014 | Miura et al. |
| 2014/0272070 A1 | 9/2014 | Asquith et al. |
| 2015/0064334 A1 | 3/2015 | Alden |
| 2015/0132451 A1 | 5/2015 | Shrestha et al. |
| 2015/0201656 A1 | 7/2015 | Liang et al. |
| 2015/0245639 A1 | 9/2015 | Nakase et al. |
| 2015/0282507 A1 | 10/2015 | Rizvi et al. |
| 2015/0289546 A1 | 10/2015 | Miya et al. |
| 2015/0296837 A1 | 10/2015 | Reiser et al. |
| 2015/0327576 A1 | 11/2015 | Cheuk et al. |
| 2015/0359249 A1 | 12/2015 | Matasovsky et al. |
| 2015/0374014 A1 | 12/2015 | Gumudavelli et al. |

FOREIGN PATENT DOCUMENTS

| | | | |
|---|---|---|---|
| CN | 104470375 | 3/2015 | |
| CN | 104489257 | 4/2015 | |
| CN | 204245115 | 4/2015 | |
| CN | 104619192 | 5/2015 | |
| EP | 0512249 | 11/1992 | |
| EP | 2874508 | 5/2015 | |
| JP | 5654408 | 1/2015 | |
| RU | 2549292 | 4/2015 | |
| WO | 1995/001734 | 1/1995 | |
| WO | 1996/039848 | 12/1996 | |
| WO | 1997/009888 | 3/1997 | |
| WO | 2001/050882 | 7/2001 | |
| WO | 2003/049545 | 6/2003 | |
| WO | 2005/084455 | 9/2005 | |
| WO | 2009/149102 | 12/2009 | |
| WO | 2010/093829 | 8/2010 | |
| WO | 2010/122107 | 10/2010 | |
| WO | 2010/140963 | 12/2010 | |
| WO | 2010/151620 | 12/2010 | |
| WO | 2012/016282 | 2/2012 | |
| WO | 2014/012225 | 1/2014 | |
| WO | 2014/111151 | 7/2014 | |
| WO | 2014/202772 | 12/2014 | |
| WO | 2015/039137 | 3/2015 | |
| WO | 2015/066009 | 5/2015 | |
| WO | WO-2015066009 A1 * | 5/2015 | ............ A23K 10/16 |
| WO | 2016/004057 | 1/2016 | |
| WO | 2016/012622 | 1/2016 | |
| WO | 2016/023004 | 2/2016 | |

OTHER PUBLICATIONS

Amendment dated May 30, 2017, filed in response to Non-final Office Action dated Feb. 28, 2017 in corresponding U.S. Appl. No. 15/154,552.
Final Office Action dated Jun. 22, 2017 in corresponding U.S. Appl. No. 15/154,552.
Amendment dated Sep. 21, 2017, filed in response to Final Office Action dated Jun. 22, 2017 in corresponding U.S. Appl. No. 15/154,552.
Advisory Action dated Sep. 27, 2017 in corresponding U.S. Appl. No. 15/154,552.
Non-final Office Action dated May 18, 2018 in corresponding U.S. Appl. No. 15/154,552.
Amendment dated Aug. 20, 2018, filed in response to Non-final Office Action dated May 18, 2018 in corresponding U.S. Appl. No. 15/154,552.
Final Office Action dated Oct. 19, 2018 in corresponding U.S. Appl. No. 15/154,552.
Amendment filed Oct. 30, 2018, in response to Final Office Action dated Oct. 19, 2018 in corresponding U.S. Appl. No. 15/154,552.
Office Action dated Jul. 9, 2020 in Canadian Patent Application No. 2985801, filed May 13, 2016.
Office Action dated Sep. 1, 2020 in Chinese Patent Application No. 201680028520.0, filed May 13, 2016.
Office Action dated Mar. 25, 2021 in Chinese Patent Application No. 201680028520.0.
Final Office Action dated Jul. 6, 2021 in Chinese Patent Application No. 201680028520.0.

(56) References Cited

OTHER PUBLICATIONS

Office Action dated Aug. 18, 2021 in Mexican Patent Application No. MX/a/2017/014203.

* cited by examiner

PALATABLE EXPANDED FOOD PRODUCTS AND METHODS OF MANUFACTURE THEREOF

CROSS REFERENCE TO RELATED APPLICATION

This application is a continuation of U.S. Utility patent application Ser. No. 15/154,552, filed May 13, 2016, which claims the priority and benefit of U.S. Provisional Patent Application Ser. No. 62/162,683, titled "Palatable Expanded Food Products" and filed on May 16, 2015, the entireties of which are incorporated by reference herein.

FIELD OF THE INVENTION

The present invention generally relates to palatable food products comprising a porous matrix of starch that is infused with flowable fat that confers a high, energy density to the products and that emits audible crunch sounds when crushed by force, as well as manufacturing processes therefor.

BACKGROUND OF THE INVENTION

Palatability is the hedonic reward provided by foods or fluids that are agreeable to the palate with regard to the homeostatic satisfaction of nutritional, water, or energy needs of a human or animal. In other words, palatability describes how much a human or animal enjoys the taste, smell, and texture of a food. Palatability of food may be a property of the food, preferences of a human or animal eating the food, or both. In pursuit of palatability, spice and flavorful fats can be applied to or combined with food, and various preparation methods may be used to make the food smell and taste good.

Palatability, nutrition, and digestibility are core characteristics of pet food formulations because the nutritional benefits of pet food are realized only if the pet food is consumed and digested by the pet. A pet's response to pet food is an indicator of its palatability, and this response is perceived by the pet's owner. If a pet appears to be enjoying a pet food, then the pet owner believes that the particular food is palatable to his/her pet. This is an important benchmark that drives sales of pet food because a pet owner will generally purchase pet food that his/her pet appears to enjoy and consume. Therefore, the palatability of pet food is used to entice pets to consume digestible food that delivers nutrients to the pet to prolong and improve its overall health and quality of life.

Palatants are selected for pet food formulations to appeal to sensory capacities of the pet including olfactory, chemesthetic (chemical irritation), taste, and texture. Palatants are comprised of different macromolecules and micromolecules that include, but are not limited to, carbohydrates, fatty acids, proteins, peptides, amino acids, vitamins, etc. Palatants can be used to mask distasteful compounds in the pet food formulation, to improve visual or auditory impact of the pet food, and/or to enhance pet appetite. Pet food formulations tend to be complex, and the palatant(s) combined with the formulation must work in synergy with the diverse mixture of tastes, textures, and aromas—each with differing chemical, physical, and sensory characteristics—of the pet food to which it is applied.

Pet food palatability can vary from species to species. For example, smell is the primary attractant for dog food because dogs are carnivores. If a food smells good to a dog, then it is highly likely that the dog will consume the good-smelling food. After a couple of bites, taste or texture may have a secondary role in palatability for dogs, as well. Cats are obligate carnivores and have a more complex palate than dogs because, while cats taste substances that are salty, sour, or bitter—unlike humans and dogs—cats are not able to perceive sweet tastes. While smell and taste are important characteristics for cat food, the shape and texture of cat food can be equally as important.

The palatability of pet food is driven predominantly by taste and aroma. Conventionally-produced expanded food products can only contain a maximum amount of taste and aroma. Taste and aroma in conventional expanded food product is limited by the amount of palatant per unit of expanded food product mass that can be feasibly coated onto the expanded food product. Palatants can be liquid or dry. Current physical aspects of expanded food products that limit the amount of palatant able to be coated on include: (1) the exposed surface area per unit mass (e.g., moderate to high density of food product), (2) the amount of palatant that can be adhered to or infused into the expanded food product, and (3) the amount of fat that can be added to the expanded food product in order to bind a dry type of palatant. As a result, a limited amount of palatant can be coated onto the expanded food product, and, consequently, the expanded pet food is limited in the amount that palatability can be improved.

Another related problem currently faced by pet food manufacturers is degradation of nutrients and nutraceuticals that are incorporated directly into the expanded food product as a result of the extrusion process. The current industry solution to address this is to either over-fortify nutrients to account for the portion that will be lost during exposure to heat, pressure, and water during extrusion, or simply not use an expanded matrix to convey other health benefits available through nutraceuticals, for example. Because of the limited amount (typically less than 3%) of palatant that can be applied externally to the expanded food product, there is little or no room to apply heat-sensitive nutrients and nutraceuticals to the expanded food product after extrusion. A means to increase the amount of ingredients that are coated onto the external portion of the expanded food product would be desirable to reduce the costs associated with over-formulation of nutrients and to be able to utilize the benefits of some nutraceuticals.

Consumers typically enjoy the response they receive from watching their pet eat pet food. Given the current approach of making high-energy-dense, expanded food products, the time in which it takes a pet to eat their meal is relatively short. As a result, means that can lengthen the eating time provide more time for interaction between a consumer and his/her pet.

This invention addresses the aforementioned shortcomings of conventional expanded food products by providing a highly palatable, expanded food product comprising a low bulk density, porous matrix having a high surface area exposed to air per unit mass, and infused by vacuum coating with liquid palatant comprising flowable fat. The combination of a low bulk density porous matrix with fat infusion increases palatant application to levels up to and higher than 50% by total weight of the expanded food product. This provides a significantly high concentration of taste and aroma per piece of expanded food product that is also an energy dense food. For example, the expanded food product may have a metabolizing energy (ME) in a range from about 2 Kcal/g to about 6 Kcal/g or higher. Consequently, the ME significantly reduces calories per piece of food product by 80% or more when compared to conventional expanded food products. The lower calories per piece results in the animal needing to consume more expanded food product and thus lengthening the time with which the owner can enjoy the pet feeding experience.

The subject matter disclosed herein relates to expanded pet food products that improve upon or overcome one or more of the shortcomings of conventional products.

Some advantages of the invention for consumers and/or pets include the ability to: (1) increase the frequency of feeding with a low bulk density, expanded food product infused with a high volume of palatant and/or fat, (2) enjoy more bonding time with their pet(s) by providing a highly palatable product that the pet will enjoy consuming, (3) minimize the possibility of exceeding a pet's recommended caloric intake and, consequently, the propensity for obesity, and (4) deliver compositions with health benefits.

Some advantages of the invention specifically for pet food manufacturing include: (1) providing a highly palatable pet food with limited number of ingredients that enhances consumer perception of the quality of the pet food, (2) lower cost per treat having a higher physical volume, (3) increased consumer facing benefits at retail for the same unit mass which enhances consumer perception of quality of the pet food, (4) increased volume of food eaten by the pet which provides an expanded pet feeding experience for the owner to enjoy, and (5) a yield of a higher volumetric capacity of existing pet food production equipment.

BRIEF DESCRIPTION OF THE FIGURES

The patent or application file contains at least one figure executed in color. Copies of this patent or patent application publication with color drawing(s) will be provided by the Office upon request and payment of the necessary fee.

FIG. 2 shows that a dry starch source (e.g., corn or rice) is milled 200 with a single pass or multiple passes through a Hammer Mill (screen size from about 0.020 inch to about 0.070 inch), Pin Mill, Cone Mill, or combination thereof, to reach a preferable particle size. A dry preservative (e.g., DHA) is blended 205 and then added with the milled starch source into a mixer 210. The blend of milled starch and preservative are then milled 215 again with a Hammer Mill (screen size from about 0.020 inch to about 0.070 inch), Pin Mill, Cone Mill, or combination thereof, in preparation for extrusion. Optional flavors, colors, vitamins, and additional preservatives are blended 220. The milled dry ingredients and optional flavors, colors, vitamins, and additional preservatives are then screened, 225, 230 and subsequently blended with water 235 in an extruder 240 to form a dough. Extrusion can occur using a two screw extruder with 9 heated zones (see Table 9), under temperature and pressure conditions that form a substantially homogenous dough. The dough expands into a porous matrix upon exit through a die and is then cut into pieces of porous matrix after exiting the extruder 240. The pieces can be dried 245 with a tray drier and cooled 250. The pieces of porous matrix are then combined with flowable fat, wet palatants 260, and dry palatants 265 in a sealed chamber 270, wherein the pieces are infused and coated using a vacuum coater, fluid bed top or bottom sprayers, or vacuum granulator. Thereafter, the porous product may be cooled 275 and coated 280 with an optional dry palatant before packaging.

FIG. 8a charts fat penetration as a log function of the amount of flowable fat infused into the porous matrix. FIGS. 8b and 8c graphically illustrate skeletal structures of the porous matrix, as well as the depth of fat penetration. Individual samples of the porous matrix with and without various amounts of fat infusion were cleaved using a razor blade. Beta-carotene was used as a luminescent dye to stain the porous matrix. Dyed samples were placed under a Nikon SMZ-U Stereomicroscope for imaging and illuminated with short wave UV light. Optical images were captured with the stereomicroscope fitted with a Nikon DS-11 Digital camera at a magnification of 5X. Measurements were made using Nikon NIS software. The skeletal structure is illuminated in blue color under UV light, while the wet and dry palatants are illuminated in yellow under UV light. FIG. 8b shows a cross sectional view of the expanded food product having flowable fat (yellow color) infused at about 35 wt % at an average penetration depth in the skeletal structure (blue color) of about 6 mm. FIG. 8c shows a cross sectional view of the expanded food product having flowable fat (yellow color) infused with less than about 2 wt % at an average penetration depth of 1 mm into the skeletal structure (blue color) of the porous matrix. FIGS. 8b, 8c also illustrate measurements of various radii of pores defined by the skeletal structure of the porous matrix.

FIGS. 9a-9f show cross sectional views of expanded food products infused with various degrees of flowable fat by wt %: FIG. 9a—about 1.6 wt %, FIG. 9b—about 5.8 wt %, FIG. 9c—about 10.8 wt %, FIG. 9d—about 16.1 wt %, FIG. 9e—about 19.1 wt %, and FIG. 9f—about 36.2 wt %. The data related to FIGS. 9a-9f are charted on FIG. 8a.

BRIEF DESCRIPTION OF THE INVENTION

Figure 1:
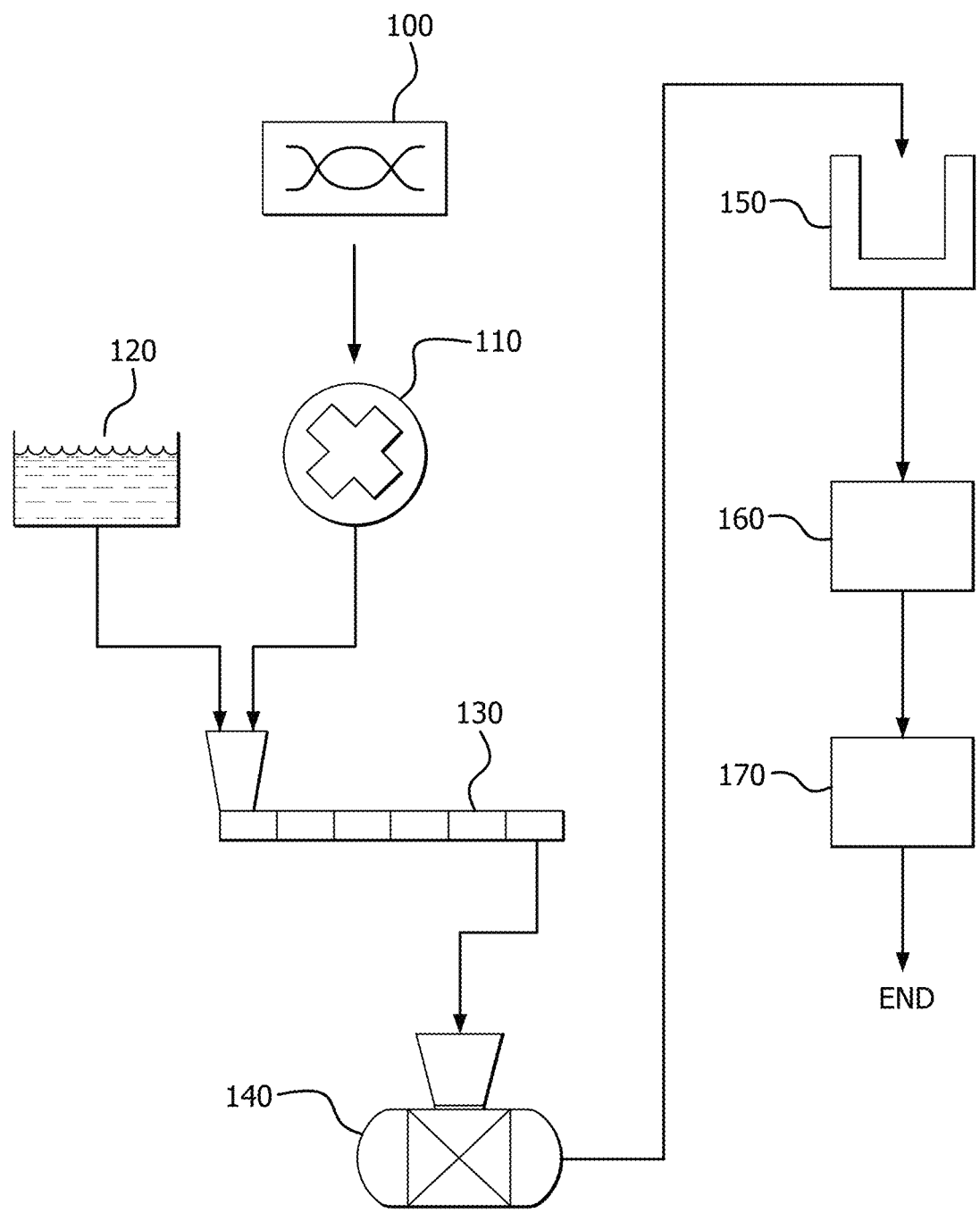
FIG. 1 shows a general process flow diagram with illustrative conditions for manufacturing a low bulk density, high palatability food product that is infused with palatant(s), such as for example, flowable fats, at levels up to and higher than about 50% by total weight of the expanded food product. For example, the process can include creating 100 a dry mix of starch (e.g., 99.5 wt % brewers rice) with a preservative (e.g., 0.5 wt % BHA) and then milling 110 the dry mix to a desired size using a Hammer Mill. The milled dry mix is next combined at a metered rate (e.g., 800 lb/hr) with water 120 (e.g., 2 lb/min) into an extruder 130 and then extruded at an extrusion speed (e.g., 800 lb/hr) to form dough that is exposed to a plurality of heated zones of the extruder used to heat the dough to temperatures that promote gelatinization of the starch (e.g., 200-205 deg. Fahrenheit). As the dough exits the extruder 130, it expands to form the skeletal porous matrix, which is later infused with wet, and optionally dry, palatant(s) using vacuum infusion in a chamber 140 and coated with palatant(s) to form the porous product. The porous product is then temporarily stored 150 in preparation for weighing 160 and then packaging 170.

Pet owners attempt to provide for the well-being of their pets by using high quality food and consumables that deliver nutrients for supporting, improving, and prolonging a pet's health and quality of life. To be effective, the food or consumable must be palatable to the pet. Palatability of a food or consumable can be enhanced by including aromas, tastes, and/or tactile sensations to improve the chances that the food will be consumed by a pet. Once consumed, the food or consumable must be digestible in order to provide nutrition and/or functional ingredients that are effective in maintaining or improving a pet's health. While the invention is disclosed for consumption by pets, it may also be adapted for consumption by humans and other non-domesticated animals.

As used herein, each of the following terms has the meaning associated with it in this application.

The term "pet" is used to refer to an animal of the type for which the food products described herein are intended to be used. By way of example, the expanded food products can be provided to and consumed by domestic cats. The expanded food product may also be intended for consumption by other toothed pets or domesticated animals, such as, but not limited to, dogs, hamsters, gerbils, and horses.

The term "expanded food product" is used to refer to an edible porous substance that can be consumed by pets, and possibly humans if the palatability of the product is adapted for human consumption. If the food product is a consumable for pets, it may also be referred to as an "animal treat," "pet treat," "pet food," "kibble" or the like.

An "expanded food product" or a portion thereof is "edible" if it is has an aroma, taste, and texture that are palatable to pets, thereby promoting mastication and swallowing of the expanded food product. Generally, an expanded food product will be considered edible if it exhibits: (i) sufficient palatability, e.g., aroma, taste and/or texture, so that a pet is not deterred by its smell or initial taste and the pet is enticed to masticate and swallow it, and (ii) sufficient digestibility so that the animal can digest the expanded food product to obtain its nutritional benefits.

The term "palatant" is used to refer to a flavorant, an aromant, or both. A palatant may be in either a liquid or dry form.

The term "flavorant" is used to refer to a chemical compound or combination of compounds that imparts a desired taste to a composition to which the flavorant is added or applied. By way of non-limiting example, pyrophosphates, fat, meat powders, and meats (poultry, mammals, fish) can be used as a flavorant for expanded food products for cats for example.

The term "aromant" is used to refer to a chemical compound or combination of compounds that imparts a desired scent or odor to a composition to which the aromant is added or applied. By way of non-limiting example, digested dry animal protein extract (DDPE) can be used as an aromant.

The term "gelatinization" is used in reference to starch and takes on the plain and ordinary meaning used in the art, namely, the process of breaking down the intermolecular bonds of starch molecules in the presence of water and heat, and allowing the hydrogen bonding sites (the hydroxyl hydrogen and oxygen) to engage more water.

The term "fat" is used to refer to any edible grade fat or lipid such as crude or refined fats.

The term "flowable fat" is used to refer to fat that is substantially fluid, e.g., as a liquid. The flowable fat can be liquid at room temperature or rendered substantially flowable by heating the fat until desired fluidity is reached.

The term "dry additive" is used to refer to a substance that is generally free of moisture or water, e.g., low moisture (e.g., less than 35%) at ambient air temperature. Examples of dry additives include, but are not limited to, dry animal digest, dry palatants, acidulants, fatty acids, amino acids, antibiotics, probiotics, alginates, vitamins, minerals, tartar control agents, antioxidants, carotenoids, flavorants, aromants, bioflavonoids, yeast, enzymes, and preservatives. An example of a dry additive in the nature of a dry digest includes a formulation of hydrolyzed (enzymatic) meat (chicken, fish, beef) product, brewer's yeast, phosphate salts, flavorant, and tocopherols.

The term "liquid additive" is used to refer to a substance that is substantially fluid at ambient air temperature. Liquid additives include, but are not limited to, liquid emulsions, liquid digests, fat-miscible and immiscible liquids, and suspensions or dispersions of solids in liquids. More specifically, examples of liquid additives include, but are not limited to, liquid animal digest, oil, flowable fat, fatty acids, tartar control agents, water, vitamins, amino acids, proteins, nutrients, aromants, flavorants, probiotics, alginates, palatants, acidulants, colorants, and preservatives. An example of a liquid additive in the nature of a liquid digest includes a formulation of liver (chicken, beef, fish), water, phosphoric acid, brewer's yeast, STPP, glycine, citric acid, diammonium phosphate, dextrose, potassium sorbate, onion spice, and BHA.

The term "porosity" is used generally to refer to the volume of interstices, e.g., pores, of a porous matrix as a percentage of the volume of the mass density of a skeletal structure of the porous matrix containing the interstices.

The term "porosimetry" is used generally to refer to measurement techniques used to quantify aspects of the porous nature of the porous matrix, such as bulk density, pore diameter, total pore volume (TOPV), and total surface area. In connection with this disclosure, Mercury intrusion techniques were used to perform porosimetry analytics. For example, Mercury intrusion techniques were performed by loading a sample into a chamber of known volume and then initially filling the void space around the sample of porous matrix with Mercury at a fill pressure of approximately 0.22 psia. The pressure was increased to force intrusion into the void space within the porous matrix and the amount intruded versus pressure was recorded and converted to a pore size distribution. The highest pressure used for intrusion was approximately 45 psia. This was used, for example, to determine bulk density, e.g., geometric density (mass of solid (g)/calculated volume ($cm^3$)), which was the density of a sample of porous matrix prior to intrusion with Mercury. Porosity was calculated using the formula TOPV×$\rho_{Hg}$×100.

Illustrative and alternative embodiments of the expanded food product, as well as methods of manufacture thereof, are described in reference to the figures that accompany this disclosure of the invention. The expanded food product is intended to be provided as edible pet treats or pet food to pets for purposes including primarily nutrition and satiation, but may also be produced to provide dental cleaning, breath freshening, administration of beneficial agents such as dry additives or liquid additives, as well as general enjoyment by a pet.

In the broadest sense, the invention is an edible, highly palatable, expanded food product comprising: (1) a low bulk density matrix having random-sized pores dispersed throughout, see for example FIG. 8c, that is (2) infused with a high volume of fat, see for example FIGS. 9d-9f, and optionally with palatants, dry additives, liquid additives, or any combination thereof, and is also (3) enrobed with an external coating comprising palatant(s). The low bulk density matrix provides a crispy "puffed" texture that arises, in part, by gelatinization of starch that is expanded to form the skeletal structure (see blue color shown in FIGS. 8b-8c, 9a-9f) of the porous matrix. Palatants are used to make the expanded food product savory in order to entice pets to taste, masticate, and swallow it. The physical characteristics of the edible food product make it easy for pets to consume it.

The composition of the expanded food product includes these ingredients: (1) starch, (2) water, (3) fat, and (4) palatant(s), all of which provide characteristics that make the product edible. The porous matrix contains a plurality of pores (or voids) interspersed throughout its low bulk density skeletal structure, see FIGS. 8c, 9a, comprised predominantly of starch and water. It exhibits sufficient rigidity and toughness (e.g., structural integrity) in response to the pressure exerted on the porous matrix, while liquids such as flowable fat and liquid palatants are forced by negative pressure in vacuum infusion into residence in the intercommunicated pores dispersed throughout the matrix, see for example FIGS. 8c, 9a. The porous matrix can withstand the forces placed on it during vacuum infusion without collapse or significant cracking or breakage of the skeletal structure. This rigidity and toughness of the porous matrix provides a crispy texture to the expanded food product, which does, however, succumb to the normal chewing force placed on it during mastication by a pet or human. With reference to FIGS. 9a-9f, the expanded food product can also include palatants that may be infused under vacuum with the flowable fat into residence in pores of the porous matrix and/or coated onto the exposed surface of the expanded food product that has been infused with flowable fat.

The total weight of the expanded food product includes from about 20 wt % to about 80 wt % starch that forms the porous matrix after extrusion and expansion of dough comprising starch and water. Various types and sources of starch may be used, so long as the desired properties of the expanded food product are exhibited by the formulation used. Starch derivatives and compounds that exhibit starch-like properties can be alternatively used in place of or in combination with starch. By way of example, starch hydrolysates and other polysaccharides can be used in place of at least a small proportion of the starch, so long as the replacement exhibits properties like those of the starch it replaces. Furthermore, pregelatinized starches may be included in the materials used to form the porous matrix. Modified starches can also be used in the formulation. The starch source can be selected on the basis of palatability considerations, as well as the size and shape of the porous matrix for the expanded food product.

The source from which the starch is obtained is not critical, so long as the starch is suitable for consumption and is generally digestible by an animal or human and can sufficiently form the porous matrix. Whole grains, broken grains, flours, roots, and tubers can be used as sources for the starch used to manufacture the porous matrix. Examples of suitable starch sources include rice, brewer's rice, corn, barley, oats, wheat, potato, legumes, and/or other biopolymers. Pure or substantially pure starches may be used if desired. These and other sources of starch can be used to form the porous matrix. Selection of starches having known amylose and amylopectin content can be selected using conventional knowledge in the art. By way of example, waxy corn, rice, and sorghum starch are known to comprise almost about 100% amylopectin. Conversely, many high amylose starches, e.g., high amylose corn starches, comprise an amylose content of about 75% of more. Amylose and amylopectin proportions can be selected by using a starting material having starch in the selected proportion, by mixing various starches from various starting materials, or by supplementing starch from natural sources with modified starches such as acid-thinned starches, high amylopectin starches, or high amylose starches. Starch may contain other components such as moisture, protein, and fat.

As is known in the field of starch chemistry, many different starches and even combinations thereof, can be used to achieve the desired properties of the porous matrix, and a skilled artisan in the field understands that a certain amount of experimentation and observation normally accompanies development and optimization of starch-containing compositions. Such experimentation is to be expected in connection with development of the porous matrix described herein.

Without being limited by any theory of operation, it is believed that the gelatinization of starch, which occurs in processing with water during formation of dough in an extruder, is responsible for the sufficient rigidity and toughness of the porous matrix. From about 50 wt % to about 100 wt % of the starch can be gelatinized during the extrusion process used to manufacture the expanded food product.

The total weight of the expanded food product preferably includes from about 10 wt % to about 50 wt % or more of fat resident in pores of the porous matrix. At least during the infusion process, the fat is present as a flowable fat to promote movement of the flowable fat into the pores of the porous matrix. Such flowable fat may be supplemented with additional dry additives, liquid additives, or combination thereof (e.g., palatants, vitamins, minerals, preservatives, dental or health aides, etc.) that can also be infused into pores of the porous matrix during manufacture of the expanded food product. Additional flowable fat may be coated on the fat-infused porous matrix to assist with enrobing the porous matrix with dry palatant.

The source from which the fat is obtained is not critical, so long as the fat is suitable for consumption by an animal or human. Animals, fish and plants can sources for the fat that is infused into residence in pores of the porous matrix. Examples of fat include animal or animal-derived fat, such as, rendered animal fat (pork, poultry, beef), tallow, white fat, grease, chicken fat, poultry fat, butter, lard, suet, and oil; fish oils; and plant or seed-derived fat, such as oil derived from palm, soybean, corn, sunflower, cottonseed, palm kernel, peanut, rapeseed, coconut, olive, vegetable, cocoa butter, and avocado. These and fat obtained from other sources can be infused into the porous matrix of the expanded food product.

While the total weight of the food product includes from about 2 wt % to about 12 wt % moisture content in its finished form, the starch is combined, during processing, with water to form a molten dough that can have a greater percentage of water (e.g., to support processing of the starch). Even after the molten dough is extruded, expanded, cut into pieces of porous matrix and then dried, the moisture content of the dried pieces of porous matrix can be about 30 wt % or less. In the finished product, however, the moisture of the food product should be from about 2 wt % to about 12 wt %. The source and purity of the water is not critical, so long as the water is suitable for consumption by an animal or human. Without being limited by any theory of operation, the water hydrates the starch and any proteins that are present therein, lubricates or facilitates movement of starch chains, and contributes to the physical properties of the porous matrix.

The total weight of the expanded food product can include about 5 wt % or more of palatant. Palatants may be in either a dry (typically less than about 12% moisture) or liquid form (typically greater than about 50% moisture). Liquid palatants have an advantage over dry palatants in that the liquid component of the palatant promotes adherence of palatant directly to the expanded food product. In contrast, dry palatants typically require another ingredient such as a fat to promote adherence at a sufficient quantity to the expanded food product. The ratio of dry palatant to fat is thus important to assure sufficient adherence of the dry palatant to the expanded food product. In one embodiment of the invention, the ratio of dry palatant to fat is one (1) part by weight of dry palatant to two (2) parts by weight of fat. In other embodiments of the invention, the ratio of dry palatant to fat is one (1) part by weight of dry palatant to three (3) parts by weight of fat, the ratio of dry palatant to fat is one (1) part by weight of dry palatant to three (3) parts by weight of fat, the ratio of dry palatant to fat is one (1) part by weight of dry palatant to one (1) part by weight of fat, the ratio of dry palatant to fat is one (1) part by weight of dry palatant to four (4) parts by weight of fat, the ratio of dry palatant to fat is one (1) part by weight of dry palatant to five (5) parts by weight of fat, and the ratio of dry palatant to fat is one (1) part by weight of dry palatant to greater than five (5) parts by weight of fat.

The palatant can be a dry or liquid animal digest, dry or liquid vegetable proteins, or any combination thereof. The animal digest can include animal protein and/or animal by-products. The protein content of the total weight of the expanded food product can range from about 5 wt % to about 20 wt % and derives largely from the palatant, the starch, or both. Animal digests are well-known in the art and are generally produced by hydrolysis (chemical or enzymatic) of animal tissue that has not undergone decomposition. The animal digest provides flavorants and/or aromants that are savory and palatable to the animal. The source of the animal digest is not critical, so long as the digest is suitable for consumption by an animal or human.

The expanded food product can contain other optional ingredients, e.g., dry additives and/or liquid additives, in addition to starch, fat, water, and palatants. During manufacture, the optional ingredients can be incorporated during extrusion into the molten dough, applied to the surface of the porous matrix, and/or blended with the flowable fat, surface coating composition, and/or dust coating before or during application.

These optional ingredients can include agents that affect the nutritional value, shelf-life, or appearance of the expanded food product without substantially affecting its physical properties (e.g., crispness and palatability). Examples of such ingredients include vitamins, minerals, nutrients, colorants, preservatives, soluble fiber, insoluble fiber and sugar. If such ingredient that is included in the food product affects a desired physical property of the food product, the content of one or more of starch, fat, water, and palatants can be adjusted to account for such effects and to maintain the properties of the food product. Any vitamins, minerals, or other nutrients included in the chewable matrix should be selected to be present in an amount or concentration suitable for ingestion by the pet. Colorants and preservatives should be selected and formulated to be present in amounts that are sufficient to achieve their respective functionalities, but also should be selected to be suitable for consumption by the animal. Preservatives, for example, can be selected to inhibit microbial growth in or other spoilage of packaged food product during storage.

The present invention comprises the ability to carry significant amounts (greater than about 5% by weight) of nutrients and nutraceuticals on the surface of or within the expanded food product. This provides the distinct advantage to the pet food manufacturer of being able to convey health benefits to the pet while avoiding the harsh manufacturing conditions that process sensitive ingredients such as nutrients and nutraceuticals would experience if they are added to the expanded food product prior to extrusion. Embodiments of the nutrients and nutraceuticals may include one or more of the following: vitamins, probiotics, colorants, antioxidants, and enzymes. Further embodiments of process sensitive ingredients may include: vitamin A, vitamin C, vitamin D, vitamin E, vitamin K, vitamin B1, vitamin B2, niacinamide, vitamin B6, folic acid, vitamin B12, biotin, pantothenic acid, probiotics such as *Lactobacillus* spp., *Bifidobacterium* spp., *Enterococcus faecium*, colorants such as caramel, FD&C yellow No. 6 lake, FD&C blue No. 2 lake, kaolin, chalk, titanium dioxide, calcium carbonate, carbon black, aluminum hydroxide, erythrosine lake, carmosine lake, and FD&C red 40 lake, antioxidants such as flavan-3-ol monomers; flavan-3-ol polymers; subsets of flavan-3-ol polymers of any desired range of unit lengths, such as up to 5 units in length or from 6 to 10 units in length; epicatechins; -(−)epicatechin; catechins; (+)-catechin; flavandiols; oligomers of flavandiols; leucocyanidins; quercetin; trans-resveratrol; epigallocatechin (EGC); epigallocatechin gallate (EGCG); (−)-epicatechin gallate; procyanidins; oligomeric procyanidins, natural alpha-tocopherol (vitamin E), synthetic TBHQ, BHA, BHT, propyl gallate, vitamin C (ascorbic acid), glutathione, rosemary extract, natural tocopherols, enzymes such as protease, lipase, papain, bromelain, amylase, and amylopectinase.

Another class of optional ingredients that can be included in or applied to the expanded food product is orally active ingredients that provide a physiological effect on the pet when it masticates the expanded food product. Examples of these orally active ingredients include dental prophylactic ingredients, breath agents, anti-halitosis agents (including those that inhibit or prevent onset of halitosis, as well as those that reduce the intensity of or eliminate halitosis), pharmaceutical agents, and combinations of these. Such ingredients can be extruded with the molten dough and dispersed within the porous matrix, combined with flowable fat and infused into pores of the porous matrix, coated on the porous matrix infused with fat, or some combination thereof. Such agents can provide functionality by way of direct contact with the teeth of the pet or by way of suspension or dissolution in an oral fluid, e.g., saliva or mucus of a pet.

Orally-active agents carried by a fluid during mastication can be subdivided into those agents having effect substantially within the oral cavity of the pet (e.g., water-soluble dental prophylactic agents, such as fluoride or anti-tartar agents, or pharmaceutical agents intended for topical delivery to oral sites of action) and those agents intended for broader systemic or gastrointestinal (GI) delivery to the pet.

An important class of orally-active agents that can be administered using the expanded food product is dental prophylactic ingredients. Examples of dental prophylactic ingredients include abrasives (for scouring tooth surfaces to remove plaque, tartar, and other materials therefrom), anti-tartar agents, fluoride and other tooth-strengthening agents, surfactants and other surface-cleaning agents, and pharmaceutical agents for topical delivery to teeth and gums (e.g., antimicrobial agents, anti-inflammatory agents, and other agents effective to treat or prevent gingivitis).

Use of abrasives for dental cleaning purposes is well known, and substantially any abrasive known for dental cleaning purposes can be incorporated into the expanded food product so long as it does not diminish the desired characteristics of the expanded food product. Suitable abrasives include particulate and fibrous abrasives. A large variety of such abrasives are known, including abrasives commonly included in human toothpastes and other animal dentifrices. Particulate abrasives include, for example, mineral powders such as gypsum, titanium dioxide, silica, calcium carbonate, and combinations of these. Other acceptable particulate abrasives include naturally-occurring and synthetic polymer particles, such as particulate celluloses and ground plant materials. Abrasive particles should be selected to be compatible with, and non-irritating to, the oral and GI tissues of the pet, in addition to being suitable for ingestion. Suitable fibrous abrasives include plant fibers, such as cotton fibers and grain brans. Fibrous abrasives also include synthetic fibers (e.g., nylon or rayon fibers) and semi-synthetic fibers (e.g., cellulose fibers isolated from a plant material). Fibers derived from animals (e.g., collagen fibers derived from tendons, ligaments, and other food animal wastes) can also be used. Abrasive fibers should be selected to be compatible with ingestion by an animal or human. Fibers can be selected that are digestible by the animal, partially digestible, or substantially indigestible.

Anti-tartar agents are another class of dental prophylactic ingredients that can be included with the expanded food product. Anti-tartar agents are preferably situated on, within, or both on the surface of and within the expanded food product. Numerous such agents are known in the art, as are the concentrations at which their respective anti-tartar effects occur. Substantially any known anti-tartar agent(s) can be used in the expanded food products, such as, for example, polyphosphates including sodium tripolyphosphate, tetrasodium pyrophosphate, sodium hexametaphosphate, and combinations of these. EDTA (ethylenediamine tetraacetic acid) and related compounds—known metal-ion chelating agents—can also be used as anti-tartar agents. Without being bound by any particular theory of operation, metal chelating agents are believed to exert their anti-tartar effects by binding metal ions that help to maintain the structure of tartar on tooth surfaces. Particularly when used in combination with abrasives, anti-tartar agents can lead to tartar removal by weakening the physical structure of tartar. Because the efficacy of metal chelating agents for anti-tartar purposes can be inhibited by the presence of free metal ions, the expanded food products which include a metal-chelating anti-tartar agent should be formulated to limit free metal ions released from the expanded food products upon its mastication. Green tea extract and other plant extracts are known to have tartar-inhibiting and tartar-removal functionality, and such extracts can also be incorporated into the expanded food products.

Another class of dental prophylactic ingredients suitable for use in the expanded food products is prophylactic pharmaceutical agents intended for topical delivery to teeth and gums. Examples of such pharmaceutical agents include antimicrobial agents, anti-inflammatory agents, and other agents effective to treat or prevent gingivitis. Other examples include antibacterial or antiviral agents intended for topical application to oral lesions. A wide variety of such agents and their use for dental therapeutic and prophylactic purposes are known in the art. Substantially any of them may be included in the expanded food product. Veterinary pharmaceutical agents having therapeutic effect are included within the class of dental "prophylactic" ingredients in recognition of the fact that treatment of oral disease symptoms and conditions will often prevent further problems, as well as for the sake of convenience.

Instead of, or in addition to dental prophylactic ingredients, the expanded food product can be used to administer a breath agent to a pet. It is well-known that pets can exhibit odiferous breath, attributable to a variety of causes including poor dental hygiene, ingestion (and/or regurgitation) of foul-smelling compositions, and colonization by microorganisms that produce undesirable odors. The tooth-cleaning ingredients and actions of the expanded food products can mitigate odors attributable to dental hygiene issues, but may not mitigate other causes.

Breath agents can be any of at least three types: perfumes, deodorants, and antimicrobial agents. Perfumes are scent-masking agents that obscure the presence of a disagreeable odor. Deodorants are compounds that capture or degrade compounds which are detectable as odors. Antimicrobial agents, by contrast, kill, inactivate, or modify the activities of microorganisms that generate odor-causing compounds. Each of these types of breath agent and their use for improving breath scent is known in the art. Examples of suitable breath agents include shredded or pulverized mint or oregano leaves, plant extracts (e.g., mint or citrus oils, herbs such as spearmint, parsley, or parsley oil, chlorophyll, or a green tea extract), bicarbonate salts (e.g., baking soda), disinfectants, menthol, and combinations of these. Other agents known to improve or mitigate undesirable breath odors can also be used.

Instead of, or in addition to dental prophylactic ingredients and breath agents, the expanded food product can be used to administer a veterinary pharmaceutical agent to a pet. The pharmaceutical agents that can be effectively administered to the pet are not limited to those intended for topical oral activity. Consumable portions of the expanded food product and oral fluids that contact any portion of the expanded food product are swallowed by the pet. As a result, any veterinary agent that is present in the expanded food product is delivered to the GI tract of the pet. Such agents that can be administered using the expanded food product include those intended for topical administration to a GI tract locus proximal to the stomach (e.g., the esophagus). Such agents also include pharmaceutical agents intended for systemic administration by way of absorption through mucosa of the GI tract, such as in the stomach, the intestines, or the bowel of a pet.

Agents that are soluble in one or more components of the porous matrix and that can withstand the extrusion conditions described herein are preferred, because they can be incorporated into the porous matrix to yield an expanded food product that delivers the agent to the pet.

The expanded food product is a highly palatable article that will entice a pet to masticate and swallow it. The presence on or within the expanded food product (e.g., as a component of the porous matrix, flowable fat, surface coating, and/or dust coating thereof) of one or more compounds having an undesirable flavor or odor can diminish the palatability of the expanded food product. If such a compound is a desired component of the expanded food product, a taste-masking ingredient can be included in an amount sufficient to render the expanded food product palatable to the pet. Numerous taste-masking compounds and techniques are known in the art, and substantially any of those can be used, so long as they are consistent with the other parameters of the expanded food product.

The expanded food product can be any three dimensional shape, e.g., sphere or sphere-like, ellipsoidal (having up to 3 or more diameters), cylindrical, disk-like, or any other 3-dimensional geometric shape, because shape is not critical. FIGS. 8b-8c and 9a-9f show cross sectional views of non-limiting, exemplary embodiments of an ellipsoidal geometric shape. The expanded food products shown in FIGS. 8b-8c and 9a-9f include a porous matrix comprising gelatinized brewer's rice starch. The size of the expanded food product is such that a pet can easily masticate and swallow it. In a non-limiting example of ellipsoidal-shaped expanded matrices, three diameters, e.g., $D_1$, $D_2$, $D_3$, can range from about 5 mm to about 20 mm. The size of the expanded food product can be larger or smaller than the non-limiting example by modifying any one or more of the extruder opening, extrusion temperature and pressure conditions, and the amount of moisture in the extrudate.

More critical, however, is that the porous matrix provides a sufficiently high surface area per volume exposed to air before infusion of fat into the porous matrix. This is accomplished by way of the low bulk density porous matrix comprising expanded gelatinized starch that forms a skeletal structure that defines pores that are uniformly or randomly sized and dispersed throughout the porous matrix and its surface as a plurality of intercommunicated pores shown, for example, in FIGS. 8c and 9a. In a non-limiting example, the surface area of the pores can range from about 0.2 m²/g to about 0.7 m²/g or more, and the increase in surface area is directly related to a porosity ranging from about 50% to about 95% or more by volume in porous matrices. The density of the skeletal structure forming the porous matrix (e.g., the density of the expanded, gelatinized brewer's rice starch) in non-limiting embodiments can range from about 30 lb/ft³ to about 80 lb/ft³.

The physical characteristics of the pores in the porous matrix are multifaceted. The pores can be uniformly or randomly shaped and sized voids. See, for example, FIGS. 8c, 9a-9c. Each pore can be symmetrical or asymmetrical with radii and diameters, see FIG. 8c, defined by the skeletal structure formed by the gelatinized starch that forms the porous matrix. The shape and size of the pores can be attributed to the ingredients from which the porous matrix is manufactured, as well as the processing conditions during extrusion and expansion of the dough.

The pore size in an expanded matrix is not critical so long as the pores can be infused with flowable fat to a desired fill volume of the porous matrix. In a non-limiting embodiment, the diameter of the pores in an porous matrix comprising, for example, gelatinized brewer's rice can range from about 0.1 to about 5.0 mm, while averaging about 0.7-1.1 mm. See FIG. 8c. Of course, the pore size can be larger or smaller depending upon the ingredients used to manufacture the porous matrix, as well as the manufacturing conditions. Within the preceding range of pore sizes, the fill volume of flowable fat infused into the porous matrix can range from about 1 ml/g to more than about 6 ml/g.

The pores of the porous matrix (pre-vacuum infusion) possess a high surface area to volume ratio enabling the porous matrix capable of receiving a significant volume of flowable fat or other aqueous liquid, which may contain or comprise palatants, dry ingredient and/or liquid ingredients, into the intercommunicated pores during infusion under vacuum. The flowable fat can be infused from the cortex of the expanded matrix into various depths of the expanded matrix and even all the way into its center. The depth of flowable fat infusion is influenced by the size of the pores and the extent of intercommunication of the pores, as well as the conditions of the infusion process including pressures used in the process and the viscosity of the flowable fat. In a non-limiting embodiment, the flowable fat penetrated into the expanded porous matrix comprising, for example, brewer's rice on average can range from about 0.6 mm to about 7.5 mm with a minimum penetration depth of about 0.1 mm and a maximum depth of about 8.3 mm into the expanded matrix. In other embodiments, the flowable fat can penetrate entirely into the porous matrix. As an overall percentage, the flowable fat penetrated from about 8-100% into porous matrix. The penetration depth correlates with the total available pore fill volume by the flowable fat and any palatants. In another non-limiting example, the average number of pores filled with the flowable fat and optional palatants can range from about 13% to about 50% or more of the total pore volume of an expanded matrix.

Even though the shape of the expanded food product is not critical, a variety of compositions are described herein of which the expanded food product is preferably made. The expanded food product comprises one or more of the following characteristics:
  i) relatively high ratio of surface area to porosity of the porous matrix, for example, a surface area ranging from about 0.2 m²/g to about 0.7 m²/g to a porosity ranging from about 50% to about 90% by volume;
  ii) a substantially high volume of fat content infused in the porous matrix (e.g., a substantially high fat content from about 30 wt % to about 50 wt % or more of the total weight of the expanded food product);
  iii) a substantially low bulk density porous matrix, e.g., from about 4 lb/ft³ to about 12 lb/ft³ (before fat infusion) with a skeletal density from about 30 lb/ft³ to about 70 lb/ft³ provided by the gelatinized starch and other ingredients that form the matrix;
  iv) a substantially reduced caloric profile for the energy dense (average from about 2 to about 6 Kcal/g), expanded food product (e.g., about 80% or more decrease in calories per piece when compared to conventional pet kibbles);
  v) a substantially high amount of palatant provided by fat infused into the porous matrix and additional fat and palatants enrobed on the fat infused porous matrix (e.g., up to about 50 wt % or more of the expanded food product);
  vi) water activity from about 0.24 to about 0.3 after the porous matrix is infused with fat; and
  vii) the ability to emit audible and measurable crunch sounds (e.g., emissions of energy in the form of measurable sound peaks) while the expanded food product is stressed to a point that causes fracturing of the underlying skeletal structure of the porous matrix.

Figure 2:
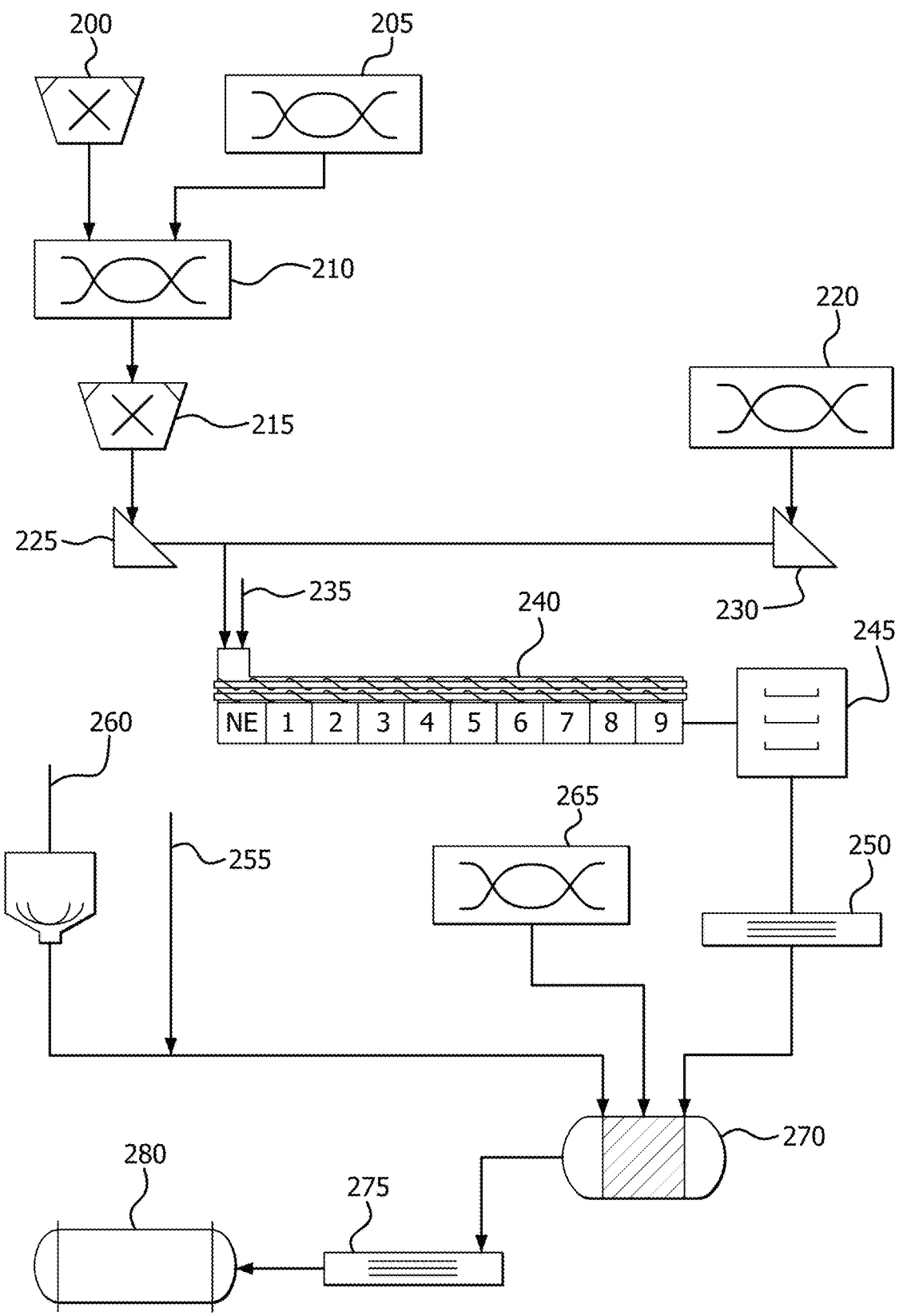
FIG. 2 shows a process flow diagram with illustrative conditions for manufacturing a low bulk density, high palatability food product that is infused with palatant(s), such as for example, flowable fats, at levels up to and higher than about 50% by weight of the expanded food product. For example.
Figure 3:
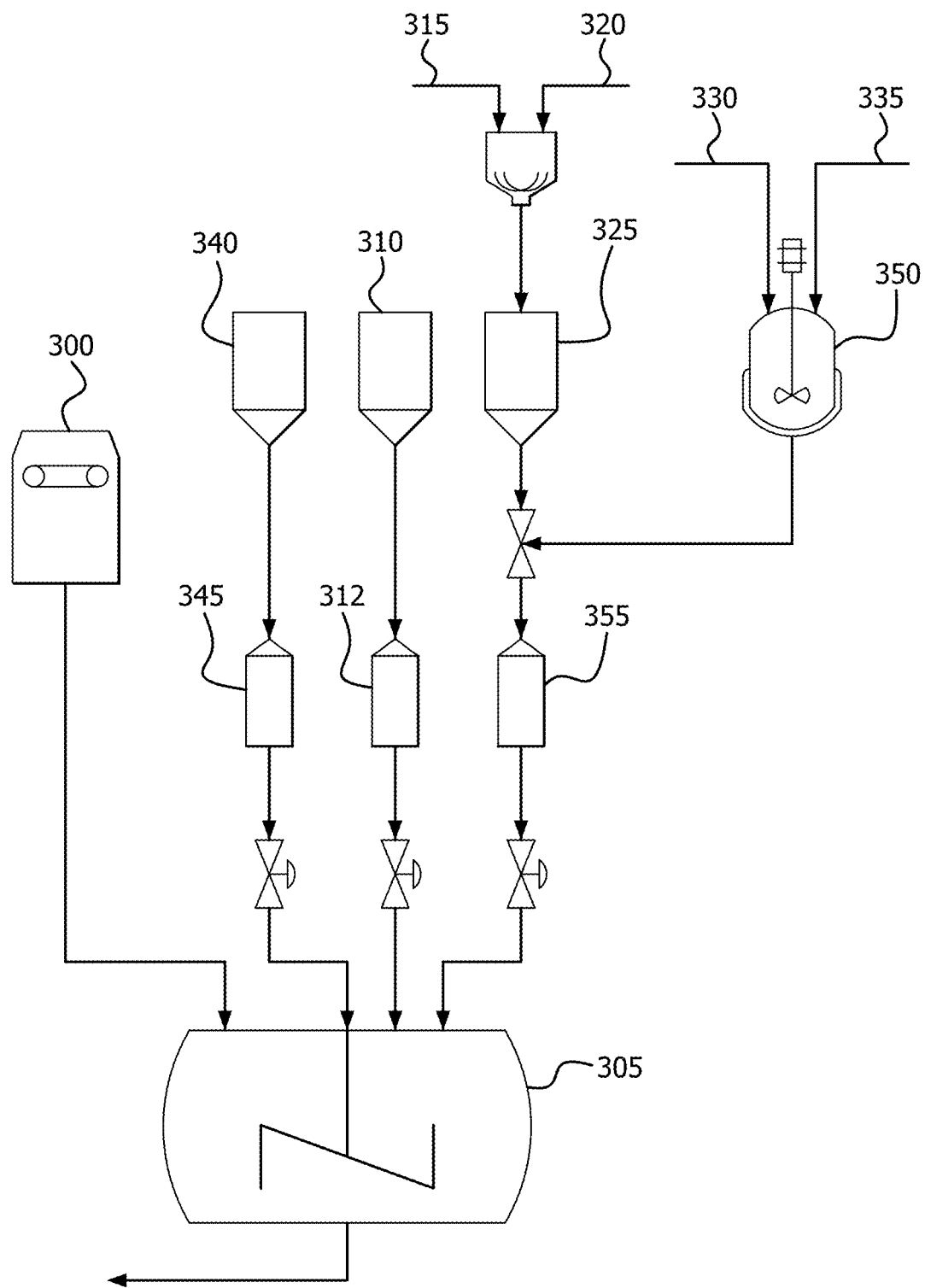
FIG. 3 shows a process flow diagram for infusing and coating a porous matrix with wet and dry palatant(s), such as for example, flowable fats, flavorants, and/or aromants.
Figure 4:
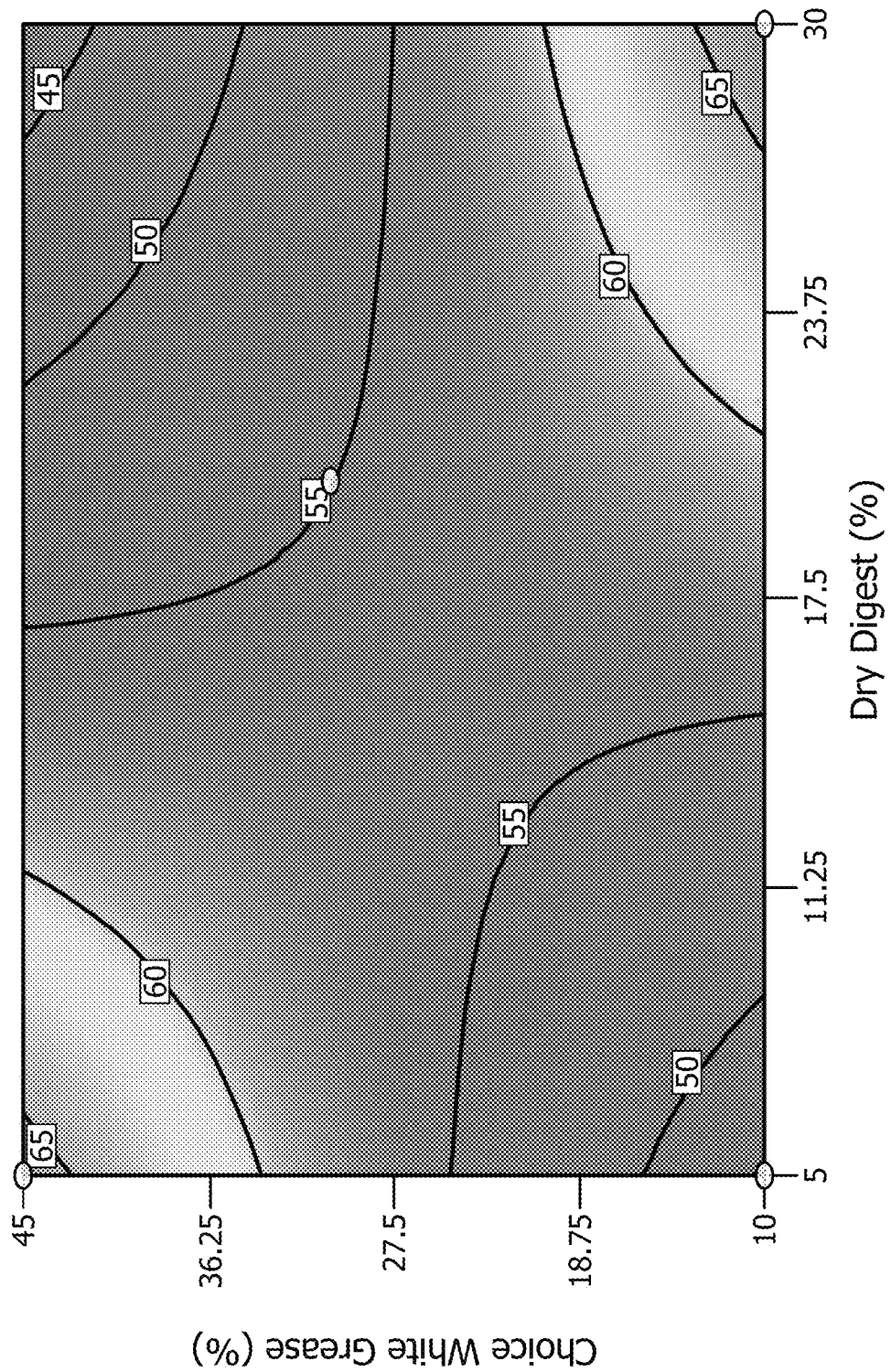
FIG. 4 shows a contour graph illustrating results of a comparison test between the expanded food products of the present invention and the Temptations® Tasty Chicken Flavor Treats for Cats (Whiskas). The test consisted of placing cats in a defined space with access to a container of the expanded food product and a container of the Temptations® product. The cats were permitted to sniff and eat either product. The expanded food product comprised corn meal (25-82 wt %) expanded according to the methods of the present invention that were infused with choice white grease (10-45 wt %) and coated with liquid digest (4-10 wt %) and dry digest (5-30 wt %) and had a moisture of about 5-8 wt %. It was observed that cats preferred the expanded food product over the Temptations® product at a consumption ratio of 65:35 or higher when the food product was optimized at the high fat level or the high dry digest (powder) level. The y-axis shows the amount of fat as a weight percentage with cats preferring the expanded pet food product with fat levels at about 35 wt % or more of fat, and the x-axis shows the dry digest level as a weight percentage with cats preferring the expanded pet food product with dry digest levels at about 20 wt % or more.
Figure 5:
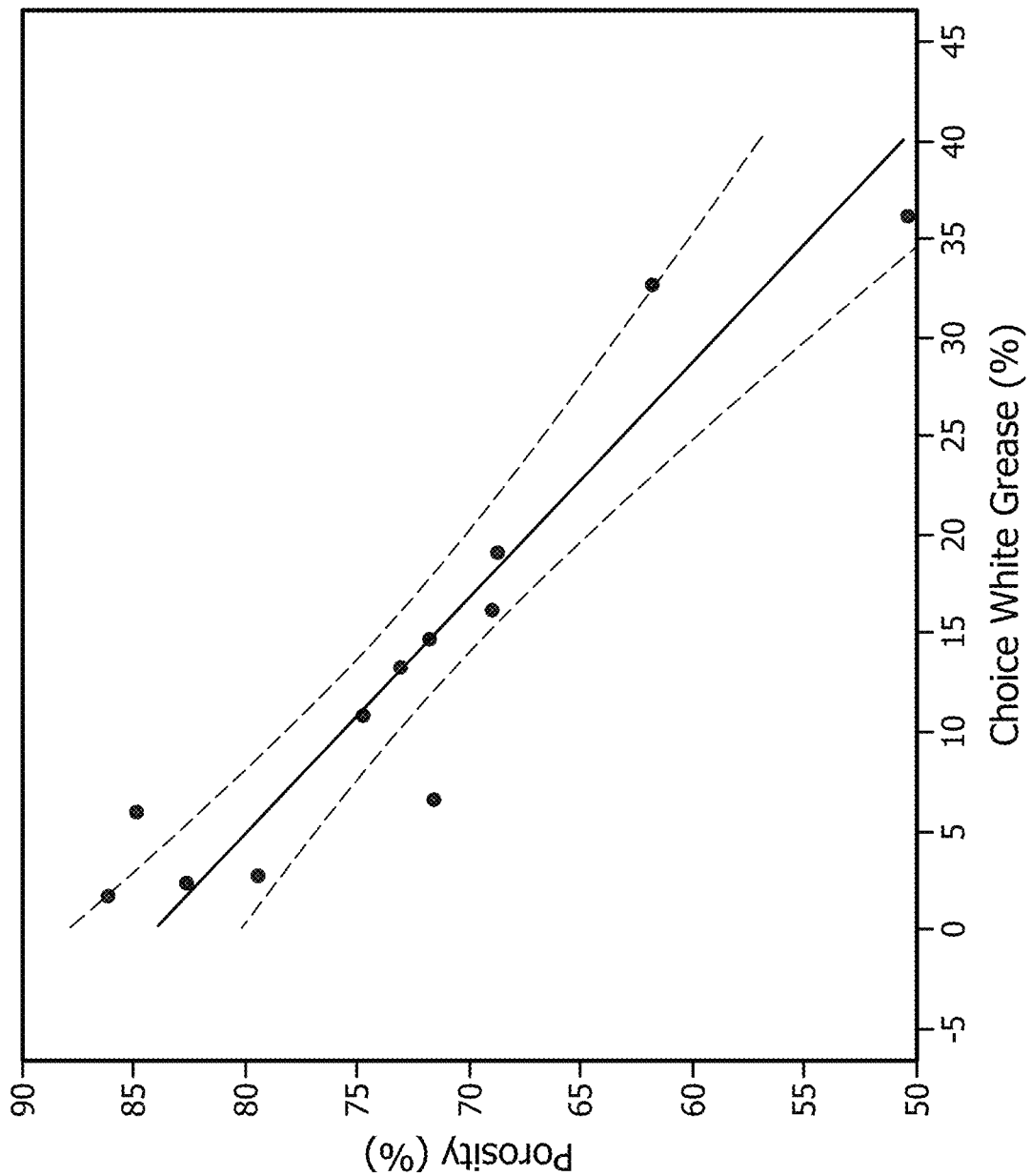
FIG. 5 graphically depicts that a decrease of porosity of a porous matrix is inversely proportional to the amount of flowable fat (e.g., choice white grease) infused into the porous matrix of the expanded food product. Determination of the porosity of samples of the porous matrix consisted of a comparison of the geometric density and skeletal density of a porous matrix. Geometric density ($\rho geo$) was determined by measuring the density of a sample with its pores in units of grams of solid per volume of solid and void space. In contrast, skeletal density ($\rho s$) was determined using helium pycnometry to measure the density of the solid skeletal portion of the porous matrix (excluding the pores) in grams of solid per volume of solid. The percentage of porosity was calculated with the formula $(1-\rho geo/\rho s) \times 100$. Geometric density was measured on a representative sample of porous matrix of a batch using calipers. Three measurements of diameter of a sample of porous matrix were taken along length ($D_1$), width ($D_2$), and height ($D_3$). Geometric density ($\rho geo$) was calculated with the formula $(3 \times W)/(4\pi \times r_1 \times r_2 \times r_3)$, where W is the sample weight and r are the principle radii calculated from the measured diameters, e.g., $r_1 = D_1/2$. Helium pycnometry measurements were performed on a single sample of porous matrix which was ground after being vacuum dried for a week prior to analysis. Helium pycnometry density measurements were conducted using an AccuPyc 1330.
Figure 6:
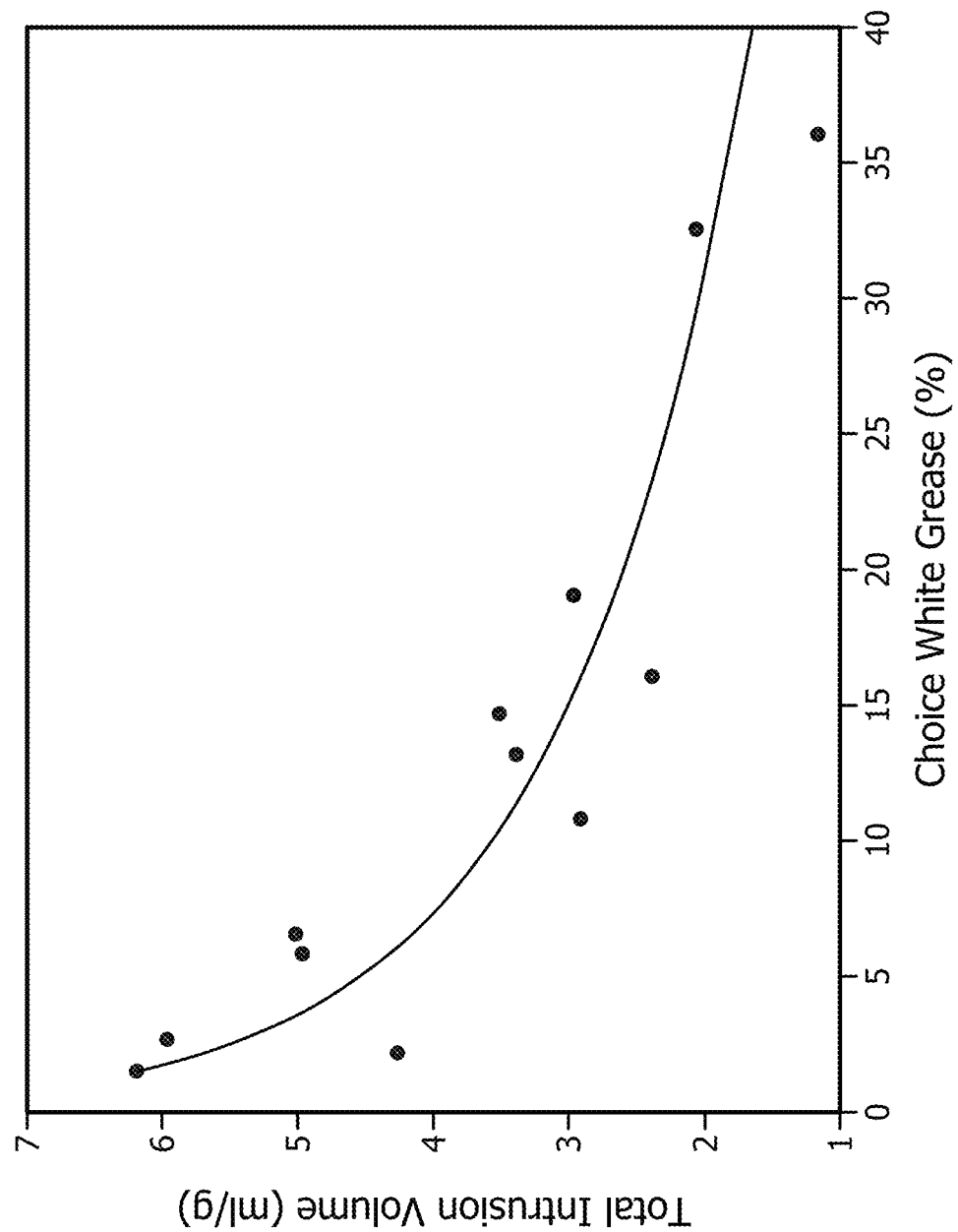
FIG. 6 graphically depicts that, as determined by porosimetry, the total intrusion pore volume (e.g., void spaces of matrix filled with flowable fat, optionally measured as ml/g) of the expanded food product decreases as the amount of flowable fat infusion in the product increases.
Figure 7:
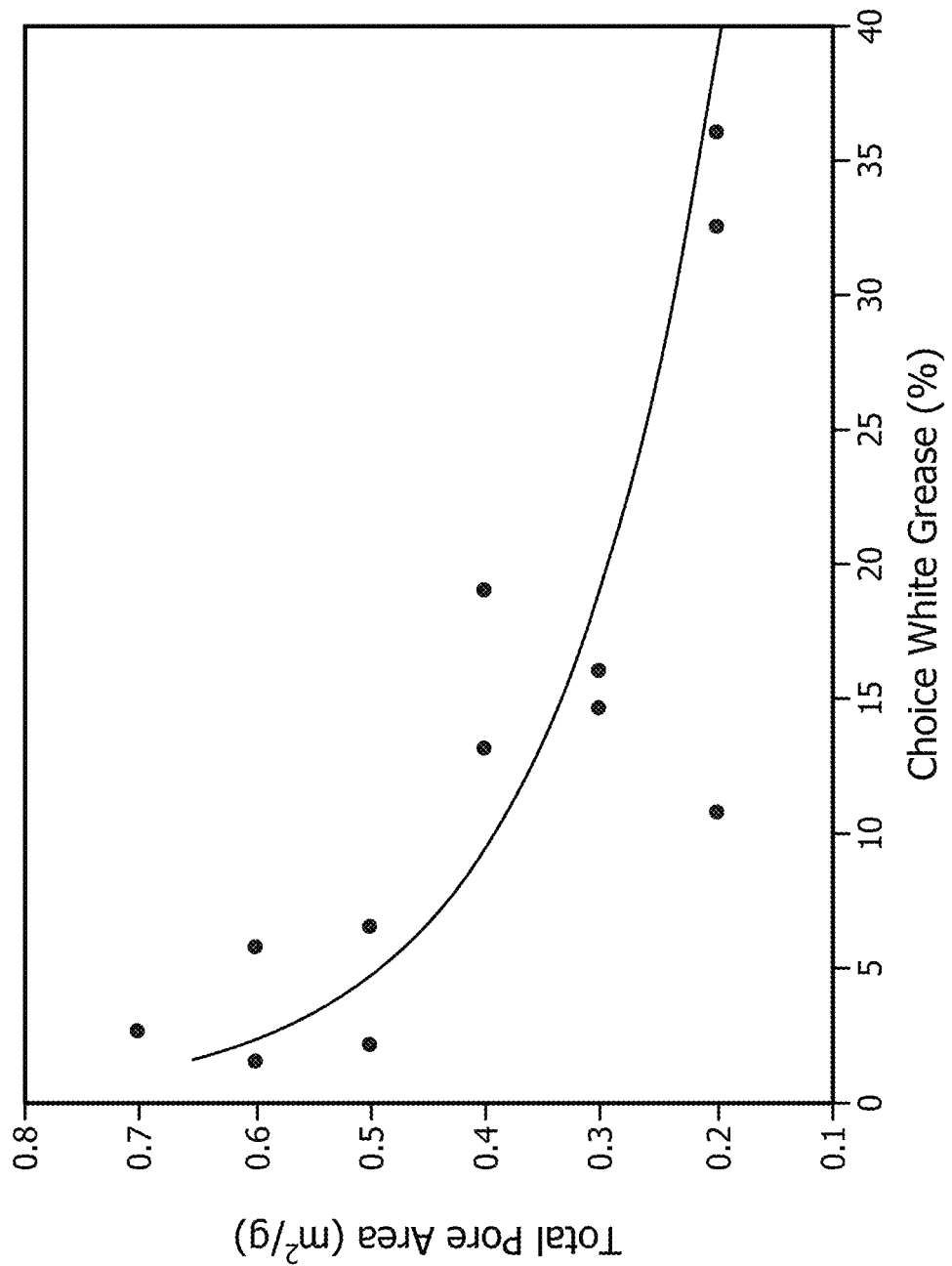
FIG. 7 graphically depicts that, as determined by porosimetry, the total exposed surface area of the skeletal surface of the porous matrix (measured as $m^2/g$) decreases as the amount of flowable fat infused in the porous matrix increases.

Referring generally to FIGS. 1 through 3, a feature of the expanded food product is the relative ease of its manufacture by a variety of processes. While the details of various manufacturing processes may differ and can be modified to reach the scope of desired end product, the overall process involves four essential steps:
  1) forming molten dough in an extruder 130, 240 under sufficient temperature, shear, and pressure conditions whereby the molten dough comprises starch and water and any optional liquid additives and/or dry additives commingled with the starch and water in the molten dough;
  2) forming a porous matrix with the extruded dough by: (i) expanding the molten dough by passing it through a die(s) of an extruder 130, 240 under conditions that permit the rapid expansion of water vapor (steam) from moisture held within the molten dough, then (ii) portioning the expanded molten dough into pieces, and finally (iii) either drying 245 (at ambient air temperature or with a heating process) and/or cooling 250 (with a cooling process) the pieces to a desired moisture content;
  3) infusing a high volume of flowable fat and any other optional liquid additives and/or dry additives commingled with the flowable fat into the porous matrix preferably using vacuum infusion, see, e.g., FIG. 3, or alternatively permitting infiltration at atmospheric pressure; and
  4) coating the fat-infused porous matrix with additional flowable fat, dry palatant(s), wet palatant(s), and/or aromants.

Referring generally to FIGS. 1 and 2, the formation of the molten dough involves two steps, namely, combining the ingredients, e.g., at least starch and water, used to create a mass of dough and then sufficiently heating the combination of ingredients, while mixing in an extruder 130, 240 under pressure, to form the molten dough so that a portion of the starch undergoes sufficient gelatinization during extrusion. What is believed to be important is that a sufficient portion of the starch, e.g., from about 50 wt % to about 100 wt %, undergoes gelatinization. This permits the gelatinized starch chains to bind together to form the backbone structure of the porous matrix upon drying and/or cooling of the molten dough after it exits the extruder 130, 240 and undergoes expansion due, in part, to vaporization moisture in the dough and drop in pressure. While not being bound by any particular theory of operation, it is believed that gelatinized starch chains interact with any proteins present in the starch and with water, and with any other optional ingredient incorporated into the molten dough. Upon expansion and cooling of the molten dough, interactions between starch chains and other optional ingredients present in the dough binds the starch and such other ingredient(s) together and to one another, thereby producing a matrix with pores created by vaporization of water within the molten dough.

In a non-limiting, illustrative embodiment, the ranges for various embodiments of recipes of wet and dry ingredients for the batch process used to make molten dough are provided in Table 1. The ingredients are listed as percentage by weight of batched ingredients introduced to an extruder. Approximates of the chemical composition exemplary brewer's rice starch recipes #1 and #2 are provided in Table 10. The amount of moisture in the molten dough will be higher than the final water content in the porous matrix, as well as the finished expanded food product due to vaporization of water during die extrusion.

TABLE 1

Batch Ingredients

| Batch (wet/dry) components for forming molten dough | Proportion of Ingredients of Total Formulation (wt %) | | | |
| --- | --- | --- | --- | --- |
| | General | High Starch Recipe | Brewer's Rice Recipe #1 | Brewer's Rice Recipe #2 |
| Starch (brewers, corn, etc.) | 70-95 | 93-95 | 94 | 93 |
| Water | 5-30 | 5 | 5 | 5 |
| Other ingredients (preservatives (e.g., DHA), vitamins, flavorants (e.g., meat flavor), antioxidants (e.g., beta carotene, Naturox,) | 0-5 | 0-2 | 1 | 2 |
| TOTAL | 100 | 100 | 100 | 100 |

Figure 8A:
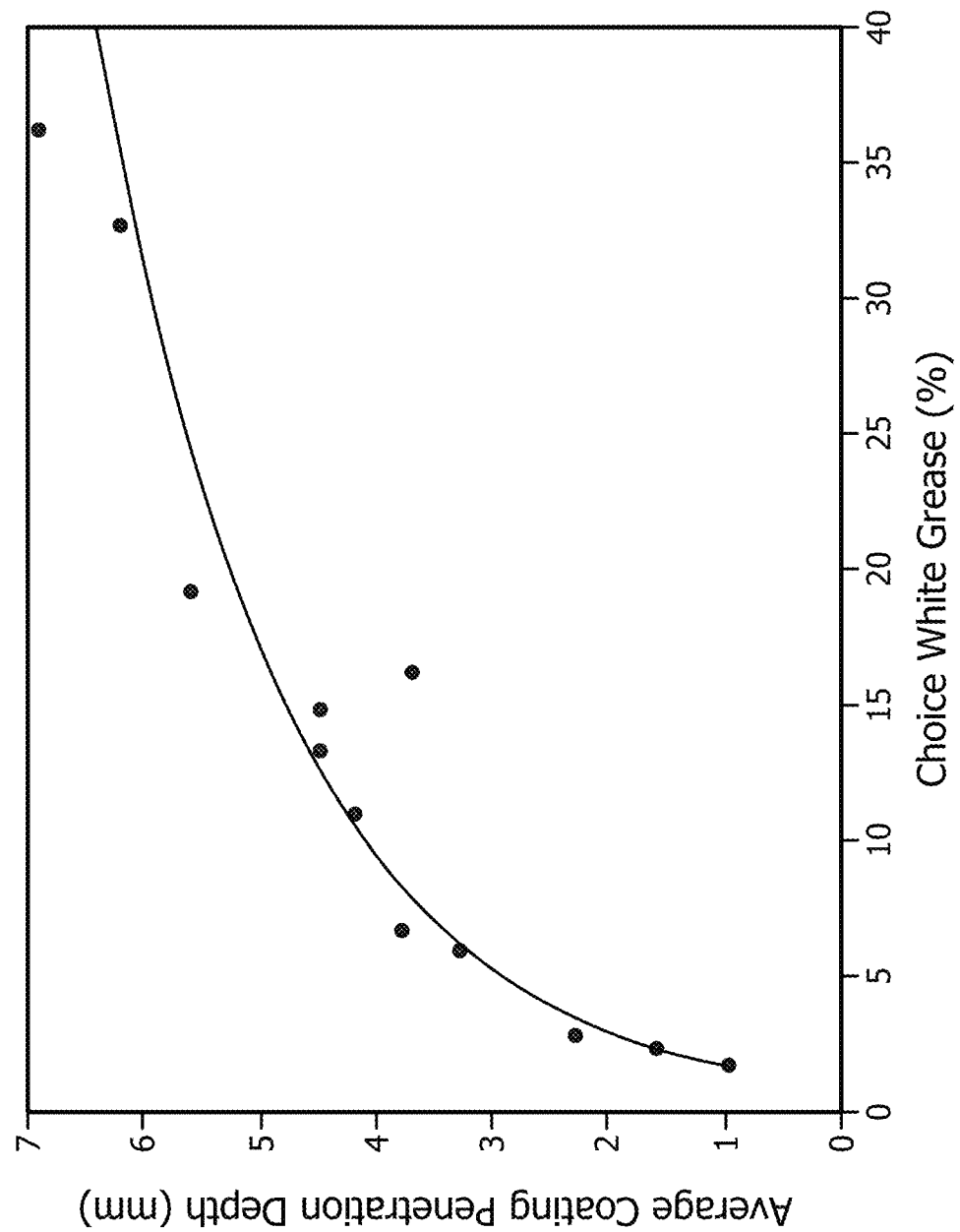
FIGS. 8a, 8b, and 8c graphically depict the depth of fat penetration into the porous matrix as percentage of total volume of the porous product, as observed and measured using optical microscopy.
Figure 8B:
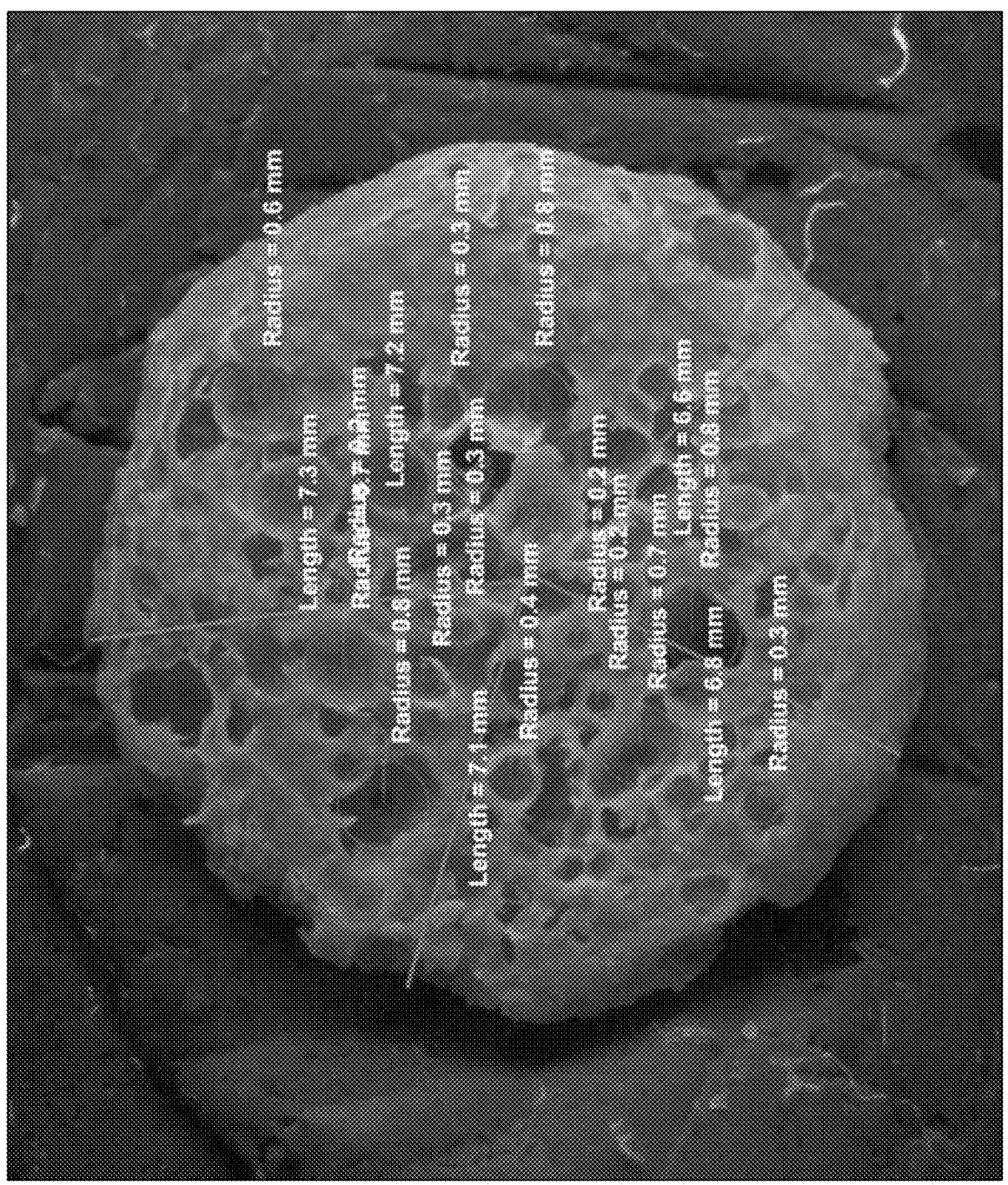
Figure 8C:
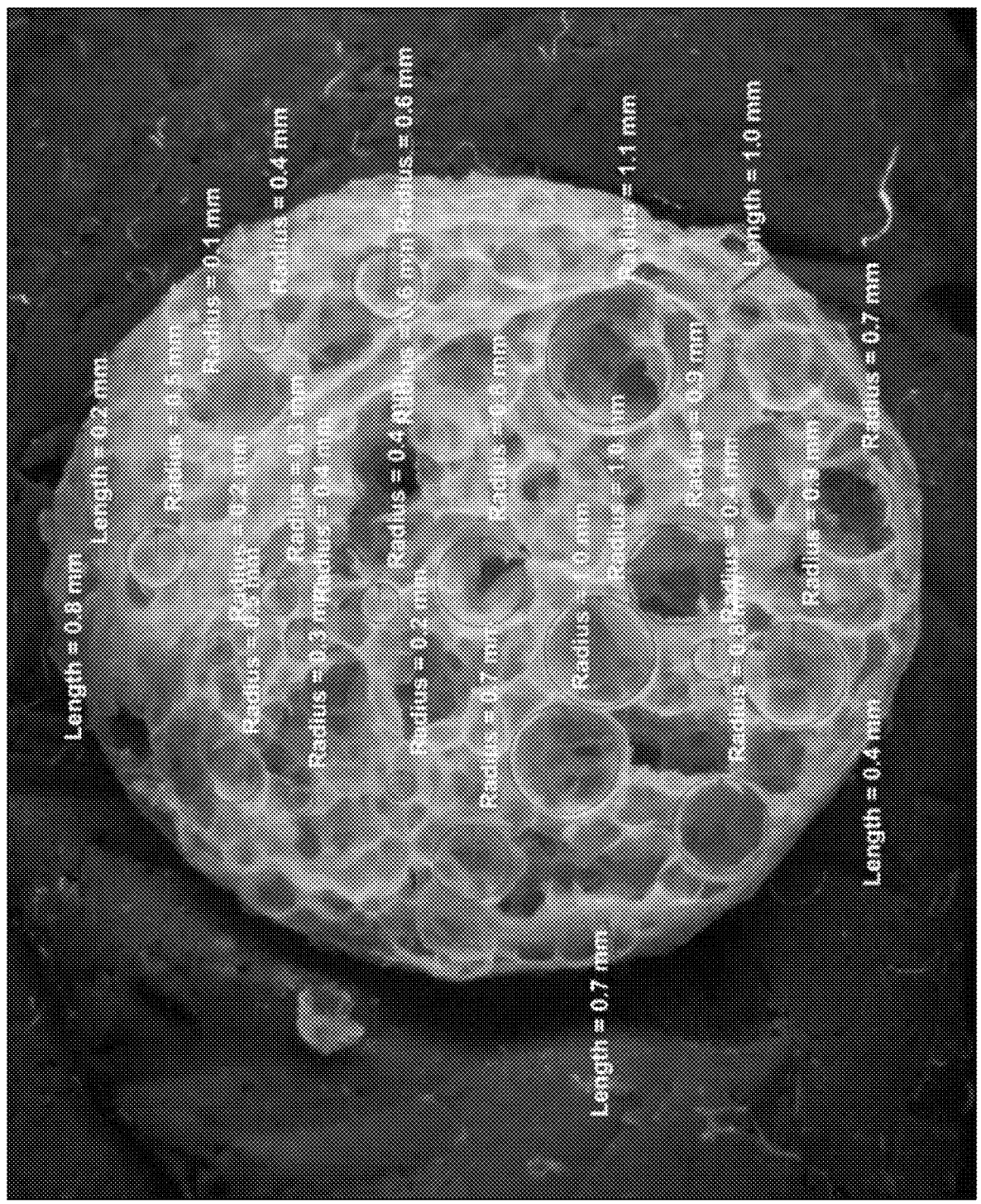
Figure 9C:
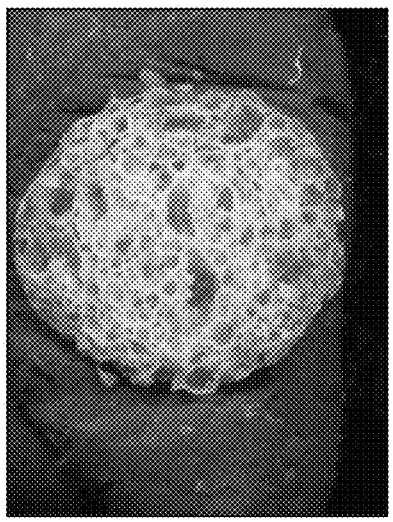
FIGS. 9a, 9b, 9c, 9d, 9e, and 9f graphically depict that the increase of flowable fat (yellow color) infused into the skeletal structure (blue color) of porous matrix causes a decrease in the porosity of the porous matrix (unfilled pores), as observed and measured using the optical microscopy technique described in the description for FIGS. 8a-8c.
Figure 9F:
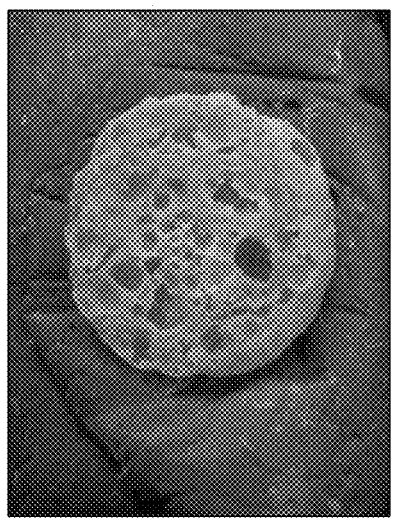
Figure 9B:
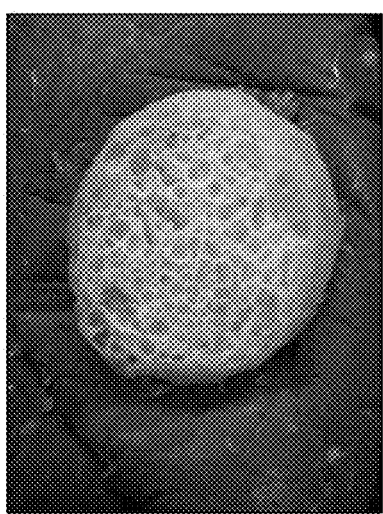
Figure 9E:
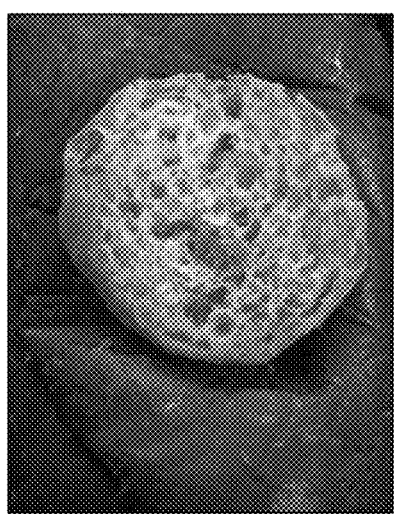
Figure 9A:
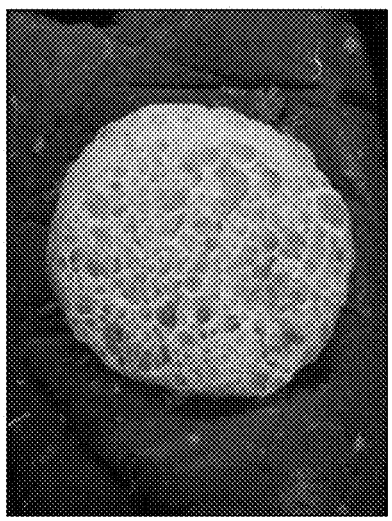
Figure 9D:
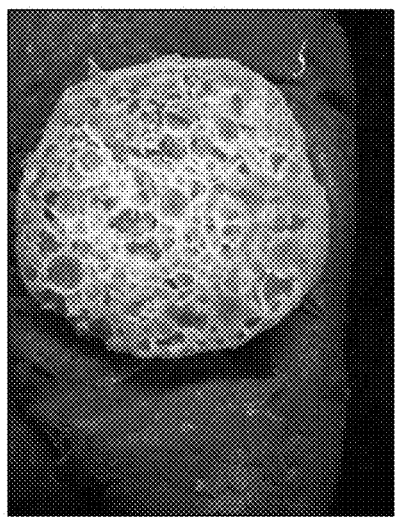
Figure 10:
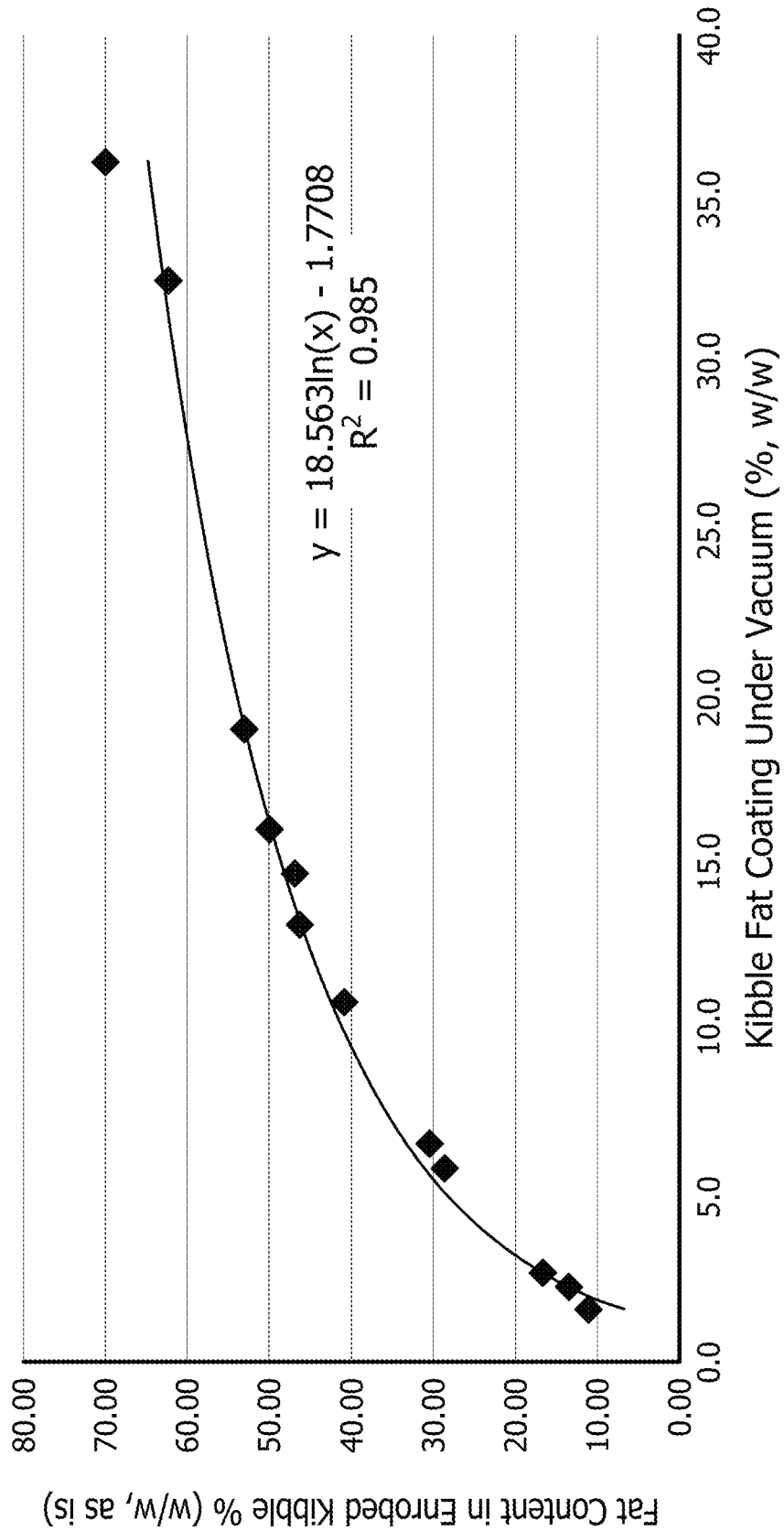
FIG. 10 graphically depicts that, as determined by porosimetry, the fat content of the porous matrix (also referred to as "Kibble") as a weight percentage increases (log) as the amount of flowable fat infusion into the porous matrix increases.
Figure 11:
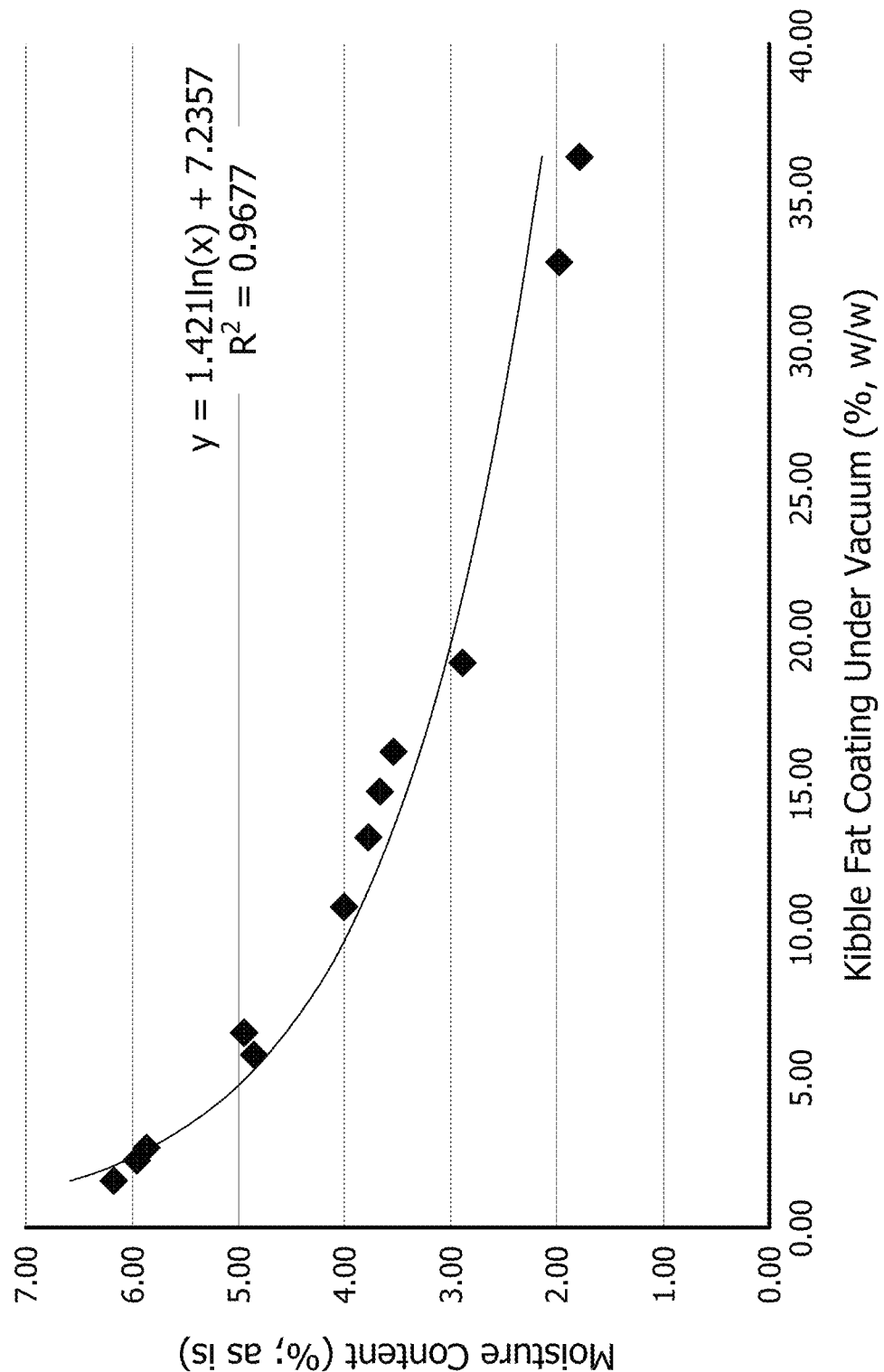
FIG. 11 graphically depicts that the moisture content of the expanded food product decreases (log) as the amount of flowable fat infusion into the porous matrix increases.

The expanded starch yields a porous matrix comprising a skeletal structure with pores, as shown, for example, in FIG. 8c. The porous matrix exhibits desired physical properties (e.g., rigidity and crispness) such that the porous matrix is perceived by pets or humans as desirable for consumption. The ingredients used to form the porous matrix (e.g., starch, water, and protein if present in the starch) are normal components of pet diets. In an exemplary embodiment, the porous matrix can comprise from about 85 wt % to about 95 wt % of starch and from about 5 wt % to about 15 wt % water. Protein may be present as a component of the starch, the palatant or a combination of both (e.g., from about 5 wt % to about 20 wt %) or there may be no protein used to form the porous matrix. Thus, in addition to encouraging mastication by pets, the expanded food products described herein tend to be harmless (or possibly nutritionally beneficial) to the pets which consume them.

In a non-limiting, illustrative example, the general proportional composition ranges for embodiments of the porous matrix (uncoated) described in Table 2. Also listed in Table 2 are composition ranges for rice-starch based and corn-starch based embodiments of the porous matrix (uncoated).

TABLE 2

Proportional Composition Ranges of Porous Matrix

| | Formulations | | |
| --- | --- | --- | --- |
| Components | General Proportional (wt %) | Rice Starch Matrix (wt %) | Corn Starch Matrix (wt %) |
| Starch | 75-90 | 75-90 | 75-85 |
| Protein | 5-8.5 | 7.5-10.0 | 7.5-8.5 |
| Fat | 1.5-3.5 | 1.5-2.5 | 2.5-3.5 |
| Moisture | 2-12 | 2-10 | 2-10 |
| Ash (e.g., non-organic mineral content, including calcium, phosphorous, zinc, iron, and other essential minerals) | 0-1.5 | 0.5-1.0 | 1-1.5 |
| Fiber | 1-3.5 | 1-1.5 | 2.5-3.5 |
| Other ingredients (preservatives, fillers) | 0-5 | 0-2 | 0-2 |
| TOTAL | 100 | 100 | 100 |

Several attributes of the porous matrix are potential drivers of providing a less greasy feel when the owner handles the treats before presenting them to their animal. These attributes include, but are not limited to, the extent to which fat penetrates into the porous matrix, as well as, the number, size and density of the surface pores. Further, the processing conditions may impact the formation of the surface pores, said processing conditions may include extruder speed, extruder temperature in one or multiple heating zones, the amount of processing water blended with the batched ingredients, the amount of batched ingredients fed into the extruder, the amount of specific mechanical energy (SME) produced by the extruder per unit of product, and the temperature of the dough exiting the extruder (e.g., product exit temperature). The ingredients that make up the formulation can also impact the formation of the surface pores, said ingredients may include the choice of starch such as rice, corn, wheat, etc., the choice of fat such as poultry fat, tallow, white grease, etc., and the addition of water. The level of each ingredient may also be important in achieving the formation of the surface pores of the porous matrix.

Another advantage of the porous matrix is that it can be formed from a wide variety of optional ingredients in addition to starch and water. Thus, these compounds, including dry additives and liquid additives, can be incorporated into the molten dough during manufacture and later released when it is masticated by pets. Such components can be incorporated into the molten dough before it is heated above the starch gelatinization temperature (e.g., for ingredients that are not temperature sensitive), while the dough is still molten, or while the porous matrix is solidifying post-expansion while drying and/or cooling (e.g., for temperature-sensitive ingredients). Because starch gelatinization temperatures tend to be relatively moderate (generally below about 212 degrees Fahrenheit and sometimes as low as about 131 degrees Fahrenheit), the molten dough can be formed at temperatures and for periods of time that will not significantly degrade many compounds and compositions having beneficial activities.

To commence the process, raw material(s), e.g., starch and other optional dry additives and/or wet additives, such as, for example, preservatives (BHA), are combined with water and thoroughly blended in an extruder to form a dough. In an embodiment, the starch can be sourced from brewer's rice or other grain or grain pieces that is ground at least once by a mill 110, 200, 215 (e.g., hammer mill or other milling equipment) to a desired size (e.g., about 3/64" in a non-limiting embodiment or other size) prior to combining with water 120, 235. The raw material(s) can be fed at a predetermined feed rate into the extruder 130, 240 by a dry material hopper or line. The water 120, 235 can be fed at a predetermined flow rate into the extruder 130, 240 by a water or steam line. For example, the feed rate for starch can be from about 100 lb/hr to about 800 lb/hr, from about 15 ft$^3$/hr to about 20 ft$^3$/hr, or other desired feed rate. The flow rate for water can be from about 50 g/min to about 180 g/min, or other flow rate. In any case, the feed rate and flow rate can be calibrated to reach a desired moisture of the dough under extrusion conditions and expanded porous matrix after extrusion.

The amount of water 120, 235 that is added to the raw materials is determined by the desired moisture content of the dough to be extruded and expanded. The water 120, 235 can be tap, filtered or other type of potable water. The target moisture level of the molten dough during extrusion can be up to about 30 wt % of the dough. In non-limiting embodiments, starch can be mixed with water at a ratio in a range from about 25:1 to about 3:1 by weight. Without being limited to any theory, the moisture level of the dough should be as low as possible under extrusion conditions to minimize the amount of drying required after extrusion and expansion of the dough.

The apparatus(es) used to mix and heat the mixture of starch, water and other optional ingredients are not critical, and substantially any equipment capable of achieving such operations can be used. Equipment designed for performing mixing and heating operations on highly viscous materials can be used. By way of example, the dough can be prepared by mixing its components and heating the resulting mixture under pressure in any of a wide variety of extruders that are available (e.g., Wenger). An extruder 130, 240 that permits control of the materials passing therethrough is suitable for forming the molten dough. For example, a suitable extruder can be a twin-screw with high or low flight configuration to produce a sufficient amount of high to low shear (e.g., friction) during extrusion. A single screw extruder may also be used, or any device or combination of devices useful for mixing, heating, and forming the mixture into a molten dough, and then extruding the dough through a die or other orifice. Of course, other forms of extruder and screw configurations can be used, such as, for example, a ribbon blender.

During extrusion, the mixture is mechanically sheared with an extruder 130, 240 under conditions of shear, pressure, and temperature to gelatinize the starch to the preferred amount by weight percentage. The extruder 130, 240 can be set at a temperature in the range from about 75 degrees Fahrenheit to about 150 degrees Fahrenheit or other suitable temperature to gelatinize starch. The processing temperature of the molten dough within the extruder can reach from about 200 degrees Fahrenheit to about 205 degrees Fahrenheit or more due to the shear placed on the molten dough. The amount of specific mechanical work (SME) applied to the molten dough by the extruder can be from about 110 KJ/kg to about 350 KJ/kg or other SME sufficient to create molten dough used to form a porous matrix with desired properties. Under these extruder conditions, the starch undergoes gelatinization preferably at least about 50% or more on a weight basis, more preferably at least about 90% or more on a weight basis, and even up to 100% on a weight basis. The dough is considered molten at this point.

The temperature of the molten dough that is under pressure in the extruder 130, 240 can exceed the boiling point of water present in the dough that is being extruded in order that vaporization of the water within the dough can be expected when the pressure applied to the molten dough in the extruder 130, 240 is released as the dough exits the extruder 130, 240. The dough can be extruded at a predetermined extrusion rate. In a non-limiting example, the extrusion rate can be from about 2 lb/min to about 10 lb/min.

From the extruder 130, 240, the molten dough is forced through an opening in a die plate, nozzle, or tubing to form a shaped extrudate at ambient air pressure. The opening can be set depending upon the desired size and shape of the extrudate. For example, the opening can be any shape such as rectangular, circular, square, triangular, elliptical, or other symmetric or asymmetric shape. In alternative embodiments, the opening can be shaped like an annular ring used to form the extrudate into a tube. The size of the opening can be any size sufficient to manufacture the porous matrix. In a non-limiting embodiment, the die opening is about 4 mm in diameter, but can be larger or smaller. In another non-limiting embodiment, the extrudate outlet temperature, which is the temperature of the molten dough as it exits the opening of the extruder, can be about 198 degrees Fahrenheit or more or even less depending upon the desired characteristics of the porous matrix, as well as the ingredients used to manufacture the porous matrix.

As the molten dough exits the extruder 130, 240 into ambient air and atmospheric conditions, the molten dough immediately and rapidly expands because of the sudden drop of pressure (from pressure within the extruder to the atmospheric pressure outside the extruder 130, 240) and flash boiling of water vapor (steam) from the moisture held within the molten mass. This expansion of the dough forms the porous matrix comprising a plurality of pores within the skeletal structure of the porous matrix which may have some pores opening onto its surface. The level of vaporization can be controlled by maintaining sufficient temperature and pressure within the extruder 130, 240, by venting gases prior to passage of the molten dough through the extruder's nozzle, or a combination of these. As result of the flash, the moisture content of the dough can be about 30 wt % or less in its expanded form.

After extrusion, the expanded extrudate can be portioned immediately after exiting the opening of the extruder by a cutting device (e.g., knife, guillotine or the like) into 3-dimensional pieces of porous matrix (e.g., pellets, disks, collettes, etc.) having a length, width, and height. Non-limiting nominal dimensions of a piece of porous matrix can have a length, width, and height each measuring from about 6.5 mm to about 16.73 mm. In a non-limiting embodiment, the pieces of porous matrix can be from about 180 degrees Fahrenheit to about 205 degrees Fahrenheit immediately after expansion.

After the extrudate is portioned into pieces of porous matrix, each piece may undergo a drying process 245 that dehydrates the pieces to a desired moisture content. The drying process 245 can involve exposing the pieces of porous matrix to heat in a heating device (e.g., oven, drum dryer, food dryer). The heat may comprise infrared radiation, microwave radiation, radio frequency radiation, direct hot air, direct flame, steam, an electric heat source, or other type of heat source. In a non-limiting embodiment, heat can be applied from about 120 degrees Fahrenheit to about 180 degrees Fahrenheit for from about 1 minute to about 5 minutes. Heating the pieces of porous matrix causes it to dry and harden and to even further expand, depending upon the amount, if any, of moisture trapped within the skeletal structure of the porous matrix, see, e.g., FIG. 8c. The heat can be applied to dehydrate the pieces of porous matrix to a final moisture content of preferably less than about 30 wt %, preferably to a range from about 2 wt % to about 12 wt %, and more preferably to a range from about 2 wt % to about 10 wt %. At these moisture levels, the final density of the porous matrix can be preferably from about 3 lb/ft$^3$ to about 12 lb/ft$^3$ and more preferably from about 3 lb/ft$^3$ to about 5 lb/ft$^3$. The dried pieces of porous matrix can be stored indefinitely in proper storage conditions or can be immediately moved to a process for vacuum infusion of flowable fat and/or aqueous liquid into the porous matrix, see, e.g., FIG. 3. Alternatively, the pieces of porous matrix can be dried by way of exposure to ambient air.

In the absence of heated drying, the pieces of porous matrix can be exposed to a cooling process after reaching the desired bulk density (e.g., from about 3 lb/ft$^3$ to about 12 lb/ft$^3$) and moisture content. The cooling process is used to lower the post-extrusion temperature of the pieces of the porous matrix to a desired temperature by passing the pieces of the porous matrix through a cooling chamber. The cooling process can aim to cool the pieces of porous matrix to a temperature in a range from about 125 degrees Fahrenheit to about 135 degrees Fahrenheit. The cooled pieces of porous matrix can also be stored indefinitely under proper storage conditions or can be transported to the vacuum infusion process to infuse them with flowable fat and/or aqueous liquids, see, e.g., FIG. 3.

In an even further embodiment, the pieces of porous matrix can undergo a drying process 245 (either heated or ambient air) and then a cooling process 250 so that the pieces of porous matrix can reach the desired bulk density and temperature for the vacuum infusion process or storage.

After drying and/or cooling, the pieces of porous matrix are preferably transferred to a vacuum infusion process as illustrated in FIG. 3. The vacuum infusion process includes applying different pressures than can range from negative pressure to positive pressure during steps to infuse and coat: (1) flowable fat into pores of the porous matrix, then (2) liquid palatant, and finally (3) dry palatant. The selected pressures can range from about −25 mmHg or less up to about 760 mmHg (atmospheric pressure) or more. The pressures are not critical so long as the pressure applied to infuse flowable fat is less than or equal to the pressure used to infuse liquid palatant and the pressure used to infuse liquid palatant is less than or equal to the pressure used to infuse and/or coat dry palatant in or on the porous matrix. For example, the pressure applied to infuse: (1) flowable fat can range from about 37.5 mmHg to about 150 mmHg, (2) liquid palatant can range from about 150 mmHg to 760 mmHg, and (3) dry palatant can range from about 600 to about 760 mmHg. An optional final coat of flowable fat can be added at atmospheric pressure, e.g., about 760 mmHg.

To begin the infusion process, which is generally outlined in FIG. 3, the pieces of porous matrix are introduced into a mixing container of a vacuum coater. The type of mixing container is not critical so long as it can be sealed and sustain application of a partial vacuum pressure, as well as contain a sufficient amount of pieces of porous matrix with a sufficient volume of flowable fat (with or without optional dry additives and/or wet additives). After introduction of a sufficient amount of pieces of porous matrix into the mixing container 305, the opening of the mixing container is closed and sealed, and a vacuum is placed within the mixing container to reduce the internal pressure of the mixing container relatively quickly to a predetermined partial vacuum pressure used to begin the vacuum infusion process.

Before, after, or simultaneously with the introduction of the dried pieces of porous matrix into the mixing container, the flowable fat (with or without optional dry additives and/or wet additives) can be added into the mixing container by any appropriate method, such as, spraying, pouring, or other mode. The flowable fat (with or without optional dry additives and/or liquid additives) can be added to reach a predetermined volume of flowable fat (with or without optional dry additives and/or wet additives) used to infuse the porous matrix to a desired volume by weight of the porous matrix.

The flowable fat and dried pieces of porous matrix are mixed together for a predetermined mixing time in the mixing container (with or without paddles) at the predetermined partial vacuum pressure to promote contact of flowable fat with the porous matrix. During application of the partial vacuum to the pieces of porous matrix, the air within the pores of the matrix is partially or totally removed allowing the flowable fat to coat each piece of porous matrix and penetrate into pores on the outer cortex of each porous matrix, as well as into the intercommunicating pores deeper within the porous matrix. It is believed that the combination of negative pressure and capillary action assists infusion of the flowable fat into the porous matrix. The predetermined mixing time (e.g., at least 15 seconds or more) will be sufficient to enhance infusion of flowable fat or aqueous liquid into the pores of the porous matrix later in the process. At the end of the mixing time, the partial vacuum pressure applied to the mixing container is removed, and the internal pressure of the mixing container is raised back to atmospheric pressure or slightly higher over a period of about 15 seconds or more. When the negative pressure is released, air entering the mixing container forces the flowable fat at least coating the outer surface of each porous matrix, and even resident in pores along the outer cortex of the porous matrix, deeper into the porous matrix. The amount of flowable fat (with or without optional dry additives and/or wet additives) is infused into each piece of porous matrix to a range from about 30 wt % to about 50 wt % of the total weight, or from about 8% to about 100% of total pore volume, of the expanded food product. In the aforementioned process, dry additives and/or wet additives may be mixed with the flowable fat prior to or contemporaneously with the introduction of the flowable fat into the mixing container to coat the pieces of porous matrix.

During the vacuum infusion process, temperature within the mixing container should be held at a temperature that maintains the fat as a flowable fat.

After the pressure in the mixing container reaches atmospheric pressure or higher, an optional coating composition can be added onto the fat-infused, porous matrix. The coating composition comprises additional flowable fat, dry additives, or liquid additives, either alone or in any combination. The surface coating composition can be introduced into the mixing container by any appropriate method, such as, spraying, pouring, or other mode, under conditions that promote adsorption of the surface coating composition into unfilled or partially-filled pores exposed to, or in near communication with pores exposed to, the surface of the fat-infused, porous matrix. It is believed that the surface coating enters open or partially open pores of the fat-infused porous matrix by capillary action.

In a non-limiting, illustrative process illustrated by FIG. 3, a batch, which can be about 38 wt % of total formulation, of pieces of porous matrix 300 are placed into a sealable coating chamber 305 at atmospheric pressure, e.g., about 760 mmHg, and ambient air temperature, and then the chamber 305 is sealed and placed under vacuum. Flowable fat 310, e.g., choice white grease heated at about 140 degrees Fahrenheit, which can be about 31 wt % of total formulation, is introduced through a metering tank 312 into the chamber 305 and mechanically mixed with the pieces of porous matrix under vacuum, e.g. about 150 mmHg, to infuse the flowable fat into pores of the matrix. Palatant 315 is batched with phosphoric acid 320 at about a 4:1 ratio to prepare a liquid palatant 325. The liquid palatant 325, which can be about 5 wt % of total formulation, is introduced through a metering tank 355 into the chamber 305 and mechanically mixed with the fat infused porous matrix under vacuum, e.g., about 450 mmHg, at about 140 degrees Fahrenheit to further infuse the porous matrix. A blend, which can be about 24 wt % of total formulation, of dry palatant 340 (consisting of about 85 wt % Biodigest and about 15 wt % yeast) is introduced through a metering tank 345 to the chamber 305 and mechanically mixed with the porous product to coat the product at atmospheric pressure and ambient air temperature. Aroma/flavoring 330, e.g., chicken flavor, is batched with flowable fat 335, e.g., choice white grease, and heated to about 140 degrees Fahrenheit to form a blend of flavoring/grease 350. The flavoring/grease 340, which can be about 2 wt % of total formulation, is introduced through the metering tank 355 into the chamber 305 and mechanically mixed with the fat infused porous product at atmospheric pressure. The coated and flavored porous product is then removed from the chamber 305 and packaged.

In an alternative process, the flowable fat can infiltrate into the porous matrix at atmospheric pressure (e.g., in the absence of vacuum pressure application) by way of capillary action.

Figure 13:
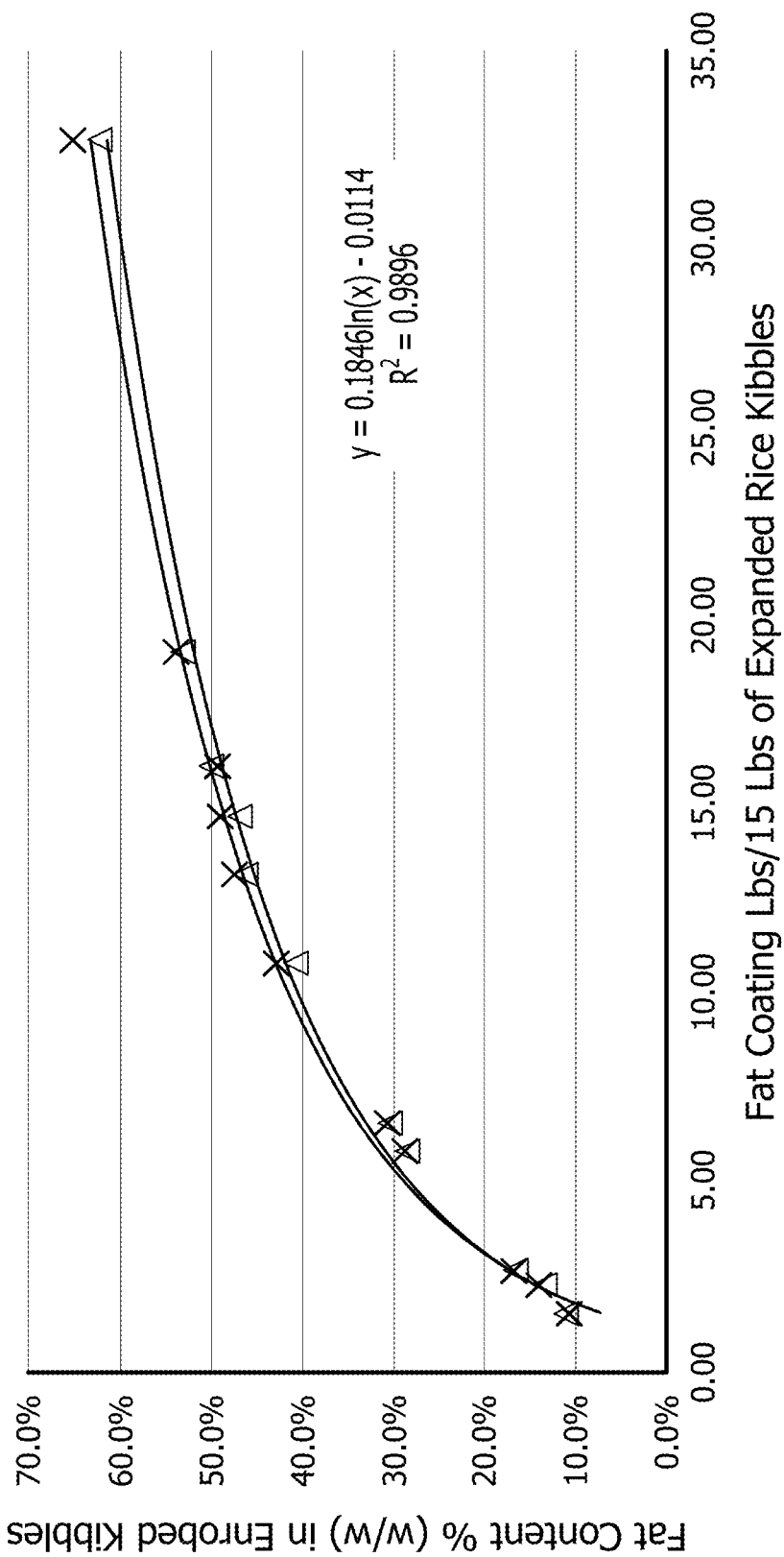
FIG. 13 graphically depicts that the vacuum infusion process used to infuse fat into the porous matrix (Δ=fat % (w/w, as is))–vacuum infiltrated to about 69%) in comparison to a non-vacuum infiltration process of soaking the porous matrix (X=fat % (w/w, as is)–non-vacuum infiltration) in flowable fat at atmospheric pressure provided similar fat content uptake when measured as a weight percentage.
Figure 16:
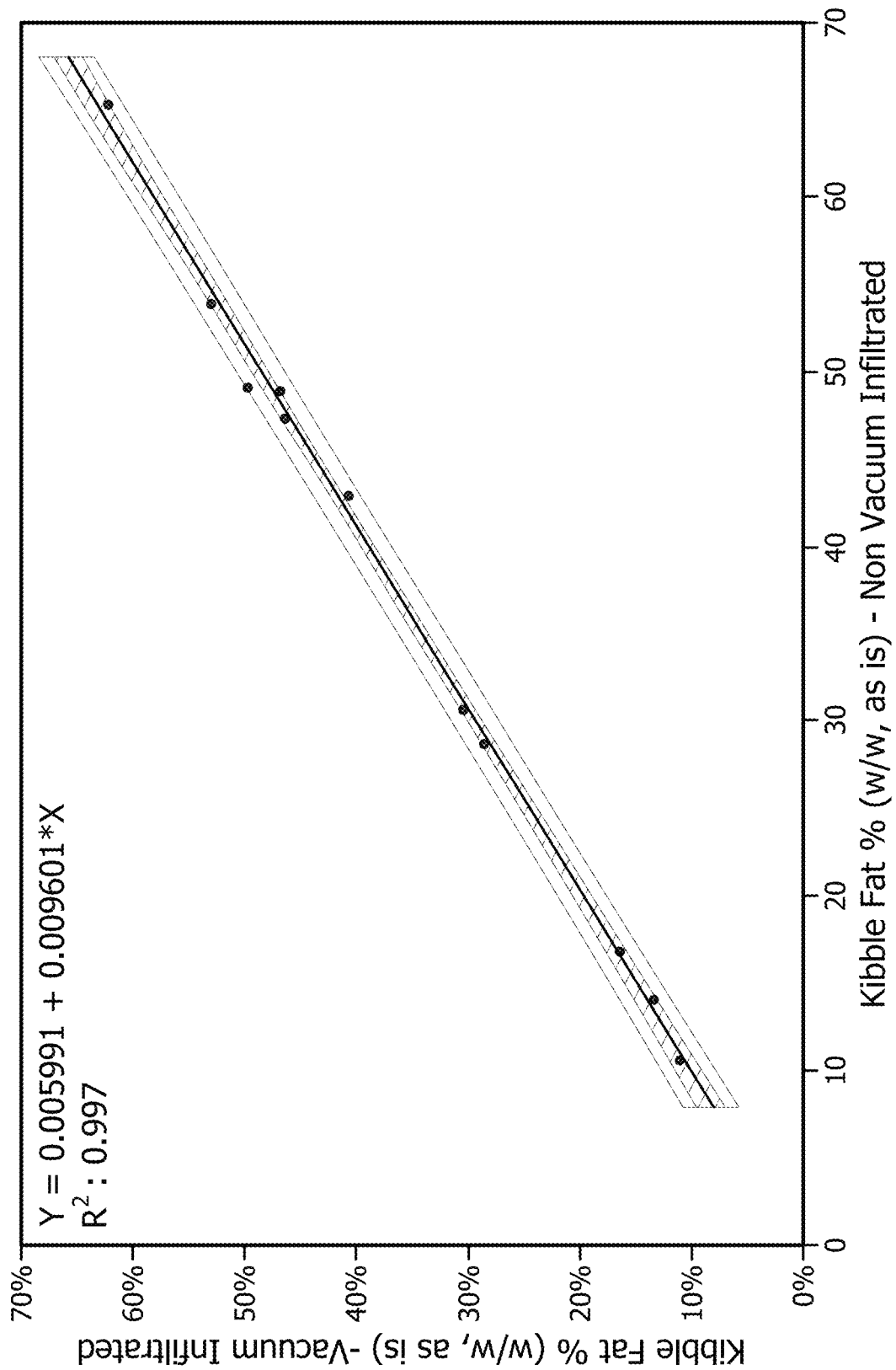
FIG. 16 graphically depicts that the vacuum infusion process of the present invention used to infuse fat in the porous matrix and a non-vacuum infiltrated process of soaking expanded food product in flowable fat at atmospheric pressure provide similar fat content uptake as measured by weight percentage.

Processes involving vacuum infused or non-vacuum infiltrated expanded porous matrices can be used to effectively load liquid fat into the expanded porous matrix. Measured flowable fat loaded into the expanded porous matrix is about the same whether vacuum or atmospheric pressure are used as processing steps. See FIGS. 13 and 16. As tested, the flowable fat content of expanded matrices infused under equilibrated vacuum and non-vacuum were not statistical different as illustrated in FIGS. 13 and 16. However, vacuum infusion is beneficial because it drives fat deep into the porous matrix and does not build up on mixing and other process equipment. Conversely, non-vacuum infiltrated expanded porous matrices have an oily film disposed on the surface and the mixing equipment show unequivocal fat build up that requires regular maintenance to clean.

In one embodiment, the surface coating composition is coated onto the fat-infused or fat-infiltrated porous matrix uniformly by tumbling the matrix with a sufficient volume of surface coating composition in the mixing container at atmospheric pressure. The surface coating will enter into pores present within the surface of the porous matrix that are not already infused with flowable fat. The surface coating may increase the amount of fat already infused into the porous matrix by about an additional about 5 wt % to about 45 wt % of total weight of the expanded food product.

Following the surface coating, the fat-infused, porous matrix can be dust coated in the mixing container or other container with dry palatants and/or dry additives. The dry palatants can be from about 5 wt % to about 45 wt % to the final expanded food product.

Table 4 summarizes illustrative ingredient ranges for embodiments of the coating that can be applied to the fat-infused, porous matrix as described herein. Components are listed as percentages by weight of the finished expanded food product.

TABLE 4

Coating Proportional Ranges

| Components in Expanded Food Product | General proportional (wt %) of Expanded Food Product |
|---|---|
| Additional Fat | 5-45 |
| Dry palatant | 5-40 |
| Wet palatant | 5-45 |

In an operation, such as the one summarized in FIG. 1 for example, the final expanded food product can be transported from the mixing container to a continuous packaging operation. For example, the final expanded product can be placed in bulk storage 150 (Storeveyer (PSG)) then later released downstream to be portioned, weighed 160, and packaged 170 in airtight containers (Volpaks).

In a non-limiting, illustrative embodiment, the general proportional composition ranges for embodiments of the expanded food product, e.g., the porous matrix infused with flowable fat and enrobed with the coating, is provided in Table 5. Also listed in Table 5 are general composition ranges for rice-starch and corn-starch embodiments. Components are listed as percentages by weight of the expanded food product.

TABLE 5

Composition Ranges for Expanded Food Product

| | Formulations | | |
|---|---|---|---|
| Components | General Proportional (wt %) | Rice-Starch Product (wt %) | Corn-Starch Product (wt %) |
| Starch | 20-80 | 21.7-60 | 21.7-60 |
| Protein | 5-20 | 5.4-16.8 | 5.9-13.8 |
| Fat | 10-50 | 11.7-47.9 | 11.6-48.2 |
| Moisture | 2-12 | 3.4-10.2 | 4.7-9.0 |
| Ash (e.g., non-organic mineral content, including calcium, phosphorous, zinc, iron, and other essential minerals) | 0-20 | 2.0-16.7 | 3.5-13.4 |
| Fiber | 0-3 | 0.1-1.0 | 0.5-2 |
| Other ingredients (preservatives, fillers) | 0-5 | 0-1 | 0-1 |
| TOTAL | 100 | 100 | 100 |

Table 6 lists illustrative general proportional chemical/physical composition ranges for the expanded food product, e.g., a corn starch-based porous matrix infused with flowable fat (e.g., choice white grease) and enrobed at atmospheric conditions with the coating as described herein. Components are listed as percentages by weight of the expanded food product.

TABLE 6

Composition Ranges for Corn-Starch Based Product

| Component | General proportional (wt %) of Expanded Food Product |
|---|---|
| Liquid digest (% by weight) | 4.0-10 |
| Dry Digest (% by weight) | 5.0-30.0 |
| Fat (% by weight) | 10.0-45.0 |
| Total Coating (% by weight) | 19.0-85.0 |
| Porous Matrix (% by weight) | 15.0-81.0 |
| Moisture (% by weight) | 4.7-9.0 |
| Protein content % (w/w, as is) | 5.9-13.8 |
| Fat content % (w/w, as is) | 11.6-48.2 |
| Fiber content % (w/w, as is) | 0.5-2.6 |
| Starch % (by difference) | 21.7-60.0 |
| Ash content % (w/w, as is) | 3.5-13.4 |

Table 7 lists illustrative general proportional chemical/physical composition ranges for the expanded food product, e.g., a rice starch-based porous matrix infused with flowable fat and enrobed under vacuum with a coating. Components are listed as percentages by weight of the expanded food product.

TABLE 7

Composition Ranges for Rice-Starch Based Product

| Component | General proportional (wt %) of Expanded Food Product |
|---|---|
| Liquid digest | 0.0-10.0 |
| Dry Digest | 5.0-35.0 |
| Fat | 10.0-45.0 |
| Brewer Yeast | 0.0-6.0 |
| Total Coating | 21.0-88.0 |
| Rice-Starch Matrix | 11.9-79.0 |
| Moisture | 3.4-10.2 |
| Protein content | 5.4-16.8 |
| Fat content | 11.7-47.9 |
| Fiber content | 0.1-1.0 |
| Starch | 21.7-56.7 |
| Ash content | 2.0-16.7 |

In a non-limiting embodiment of the invention, the expanded food product can be manufactured according to the process shown and conditions described in FIG. 2. In this example, the raw ingredients, which can be selected for example within the batch ranges summarized on Table 1, are fed into an extruder set with a powder feed rate of about 70 rpm. This introduces powder (dry) ingredients including the starch into the extruder. The starch (e.g., corn, rice, etc.) can be ground to a particle size from about 400 to about 800 μm. The water flow rate can be set from about 0.04 to about 0.08 wt % of the total formula or alternatively from about 50 to about 180 g/min. This introduces water into the extruder to be combined with the dry ingredients. The total feed rate can be about 111 lb/hr. The in-feed rates can be set to produce product at a rate at about 4.88 lb/min. These settings are not critical and can be adjusted to obtain a desired production rate for the porous matrix. Examples of the chemical/physical characteristics of the raw ingredient components are provided in Table 8.

TABLE 8

Composition of Expanded Food Products

| Component | Brewer rice flour % (as is) | Corn flour % (as is) |
|---|---|---|
| Moisture | 11.50 | 13.50 |
| Protein | 7.50 | 7.20 |
| Fat | 1.50 | 2.80 |
| Fiber | 1.05 | 2.80 |
| Starch | 77.82 | 72.60 |
| Ash | 0.63 | 1.10 |
| TOTAL | 100 | 100 |

The extruder can be configured to provide high or low sheer and set with speed at 200-280 rpm, torque at 24-84, and power at 12-75 Kw. With referenced to FIGS. 1 and 2, the extruder barrel temperature can be set at 75-200 degrees Fahrenheit. The barrel of the extruder can have multiple heating zones. In illustrative embodiments, the barrel of the extruder can have 7 heating zones (FIG. 1) or 9 heating zones (FIG. 2) that are set at temperatures provided in Table 9.

TABLE 9

Temperature Settings in Zones of Extruder Barrel

| Zone | Extruder Temperature Set Point (degree Fahrenheit) | Extruder Temperature Set Point (degree Fahrenheit) |
|---|---|---|
| 1 | 75-150 | 75 |
| 2 | 93-150 | 75 |
| 3 | 94-160 | 75 |
| 4 | 98-158 | 75 |
| 5 | 100-299 | 75 |
| 6 | 106-195 | 75 |
| 7 | 170-194 | 75 |
| 8 | none | 100 |
| 9 | none | 200 |

Figure 17:
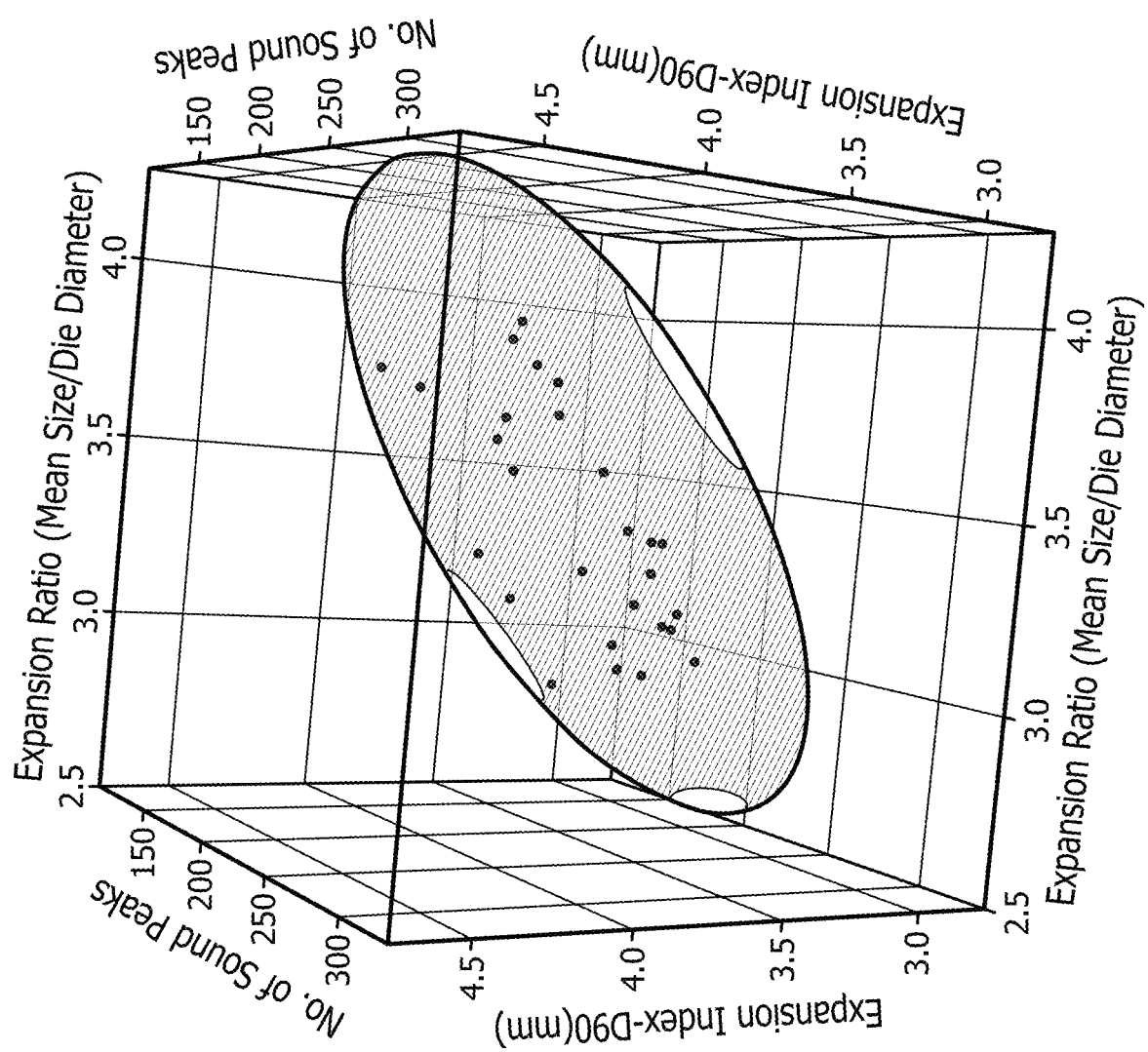
FIG. 17 graphically depicts the relationship between the expansion ratio (mean product size/diameter of extruder die) of the expanded porous product, the expansion index-D90 (mm), and the number of measurable sound peaks tested by the texture analyzer with the Varela process (referenced in the description for FIG. 12).

Under these conditions, the extruder (twin screw) can exert a specific mechanical energy (SME) of about 115-350 KJ/kg to mix and form molten dough. During extrusion, the heat and pressure are provided to form a molten dough that can be about 202-267 degrees Fahrenheit at about 302-832 psi. Upon exiting the extruder die, which can have multiple openings, the molten dough immediately expands into a porous matrix and then cools to about 198 degrees Fahrenheit. In a non-limiting embodiment, and as shown in FIG. 17, the expansion ratio of the extrudate leaving the extruder (mean size/die diameter) ranged from about 2.5 to about 4.0. The porous matrix can be a bulk density within the disclosed ranges including specifically about 3.5-12.6 lb/ft$^3$.

The chemical/physical characteristics of a preferred composition of the porous matrix manufactured according to the preceding process are provided in Table 10.

TABLE 10

Composition of Expanded Porous Matrices

| Component (approximate) | Expanded Rice Matrix #1 (wt %, as is) | Expanded Rice Matrix #2 (wt %, as is) | Expanded Rice Matrix #3 (wt %, as is) | Expanded Corn Matrix % (as is) |
|---|---|---|---|---|
| Moisture | 8.0 | 8.2 | 8.00 | 8.00 |
| Protein | 8.4 | 9.3 | 7.80 | 7.48 |
| Fat | 1.9 | 34.1 | 1.56 | 2.91 |
| Fiber | 1.1 | 0.6 | 1.09 | 2.91 |
| Carbohydrate | 80 | 39.0 | 80.90 | 75.47 |
| Ash | 0.7 | 8.4 | 0.65 | 1.14 |

Turning now to products in the marketplace, commercial cat treats are on average denser and have a lower porosity than the expanded food products of the present invention. For example, the expanded food products that are within a wide target of fat content of about 1% to about 60% (w/w) exhibit porosities (ranging from about 71% to about 82% by volume) that are significantly higher in comparison to commercial cat treat counterparts (from about 26% to about 63% by volume). The comparative test results are shown on Table 11.

TABLE 11

Comparative Porosity of Commercial Products

| Sample ID | Sample Description | Base Composition | % (Porosity) |
|---|---|---|---|
| AMG-042015-CFPO | Cascadian Farm Purely O | Oat expanded cereal (human food) | 86.74 |
| AMG-042015-PWL | Purina Whisker Lickin's | Cat Treat | 26.54 |
| AMG-042015-PFPMC | Purina Friskies Party Mix Crunch Original | Cat Treat | 51.40 |
| AMG-042015-PFPMP | Purina Friskies Party Mix Puffs Island Paradise | Cat Treat | 47.50 |
| AMG-042015-PF7F | Purina Friskies 7 Favorites | Cat Treat | 40.39 |
| AMG-042015-CFBVP | Cascadian Farm Berry Vanilla Puffs | Corn expanded cereal Puffs (human food) | 79.53 |
| AMG-042015-CPC | Chester's Puff corn Cheese | Corn expanded snack cheese curl Puffs (human food) | 91.50 |
| AMG-042015-MMOC | Meow Mix Original Choice | Cat Treat | 63.12 |
| AMG-042015-VSRC | Veganic Sprouted Brown Rice Crisp | Brown Rice Crisp Cereal (human food) | 77.15 |

Figure 12:
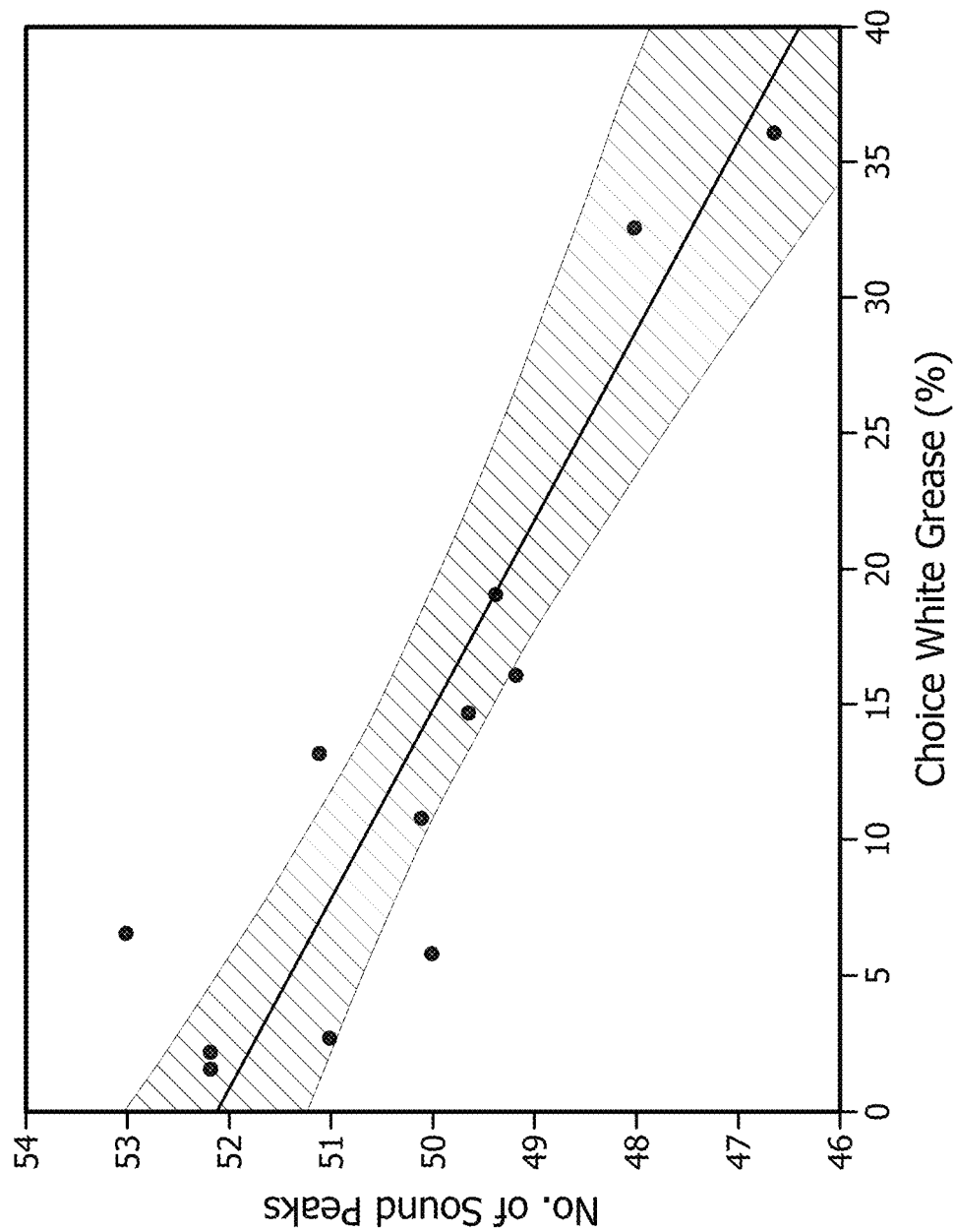
FIG. 12 graphically depicts that audible sounds, which were measured as sound peaks by a texture analyzer produced by exerting force on the expanded food products with various degrees of fat infusion (wt %), decrease as the amount of flowable fat increases in the porous matrix (wt %). The audible crunch was determined by measuring energy emissions in the form of sound peaks while expanded food products were crushed by a metal plate in a texture analyzer according to the method described in P. Varela et al., "Crispness assessment of roasted almonds by an integrated approach to texture description: texture, acoustics, sensory and structure," *J. Chemometrics*, 20: 311-320 (2006).

One unique feature of the expanded food product is its ability to produce a distinctive audible crunch sound while it is being chewed or crushed. Measuring the audible crunch sound of food while it is crushed either by mastication or a mechanical device, such as a texture analyzer, is well known in the trade and academia as a way to assess the crispness/crunchiness of foods. With reference to FIGS. 12 and 17, the physical characteristics of brewer's rice-based expanded food products with varying degrees of infusion of fat were analyzed for an audible crunch using the Varela process referenced in connection with FIG. 12, as modified in the description that follows.

Expanded food products (e.g., brewer's rice based formula infused with fat (choice white grease and liquid palatant) to various degrees (wt %) by volume) were tested by a texture analyzer set in compression mode (Test 1). The trigger type set at auto (force) with the plotting to stop at trigger return. The analyzer had a pre-test speed set at 34.8 mm/min with the post-test speed set at 300 mm/min. The test settings were: test speed 3 mm/min (revised from Varela), target mode: distance (5 mm), trigger force 1.0N.

With reference to FIGS. 12 and 17, as well as Table 12, the number of audible sound peaks recorded while the expanded food products were stressed to the point of structural failure, dissipated energy and produced audible shock waves, also referred to as "sound peaks." The tested expanded food products produced sound peaks ranging in number from about 46-53 as shown on Table 12. The sound peaks were produced from expanded food products with varying degrees of infusion of choice white grease and additional flowable fat from the coating process. The tested expanded food products had water activity (e.g., about 0.24-0.29) within the target moisture percentage (e.g., about 1.78-6.17 wt % of finished product).

TABLE 12

Summary Test Data for Audible Sound Peaks

| ID # | Choice White Grease (wt %) | Avg. Pore Dia. (mm) | Avg. Coating Penetration Depth (mm) | No. of sound peaks | Texture analysis Peak area (N · sec) | Fat % (w/w, as is) | Moisture (%) | Water activity (25° C.) |
|---|---|---|---|---|---|---|---|---|
| 23 | 36.16 | 0.9 | 6.9 | 46.64 | 9.17 | 69.73 | 1.78 | 0.288 |
| 8 | 19.08 | 0.8 | 5.6 | 49.36 | 8.07 | 52.94 | 2.88 | 0.289 |
| 9 | 13.20 | 0.9 | 4.5 | 51.10 | 8.15 | 46.25 | 3.77 | 0.255 |
| 21 | 14.73 | 0.8 | 4.5 | 49.64 | 7.50 | 46.82 | 3.66 | 0.268 |
| 12 | 16.07 | 1.0 | 3.7 | 49.18 | 9.28 | 49.84 | 3.53 | 0.289 |
| 6 | 32.60 | 1.0 | 6.2 | 48.00 | 8.55 | 62.23 | 1.97 | 0.29 |
| 18 | 10.84 | 0.9 | 4.2 | 50.09 | 9.42 | 40.74 | 4.00 | 0.268 |
| 25 | 6.58 | 0.7 | 3.8 | 53.00 | 9.37 | 30.38 | 4.94 | 0.264 |
| 19 | 2.27 | 0.9 | 1.6 | 52.18 | 9.28 | 13.37 | 5.95 | 0.24 |
| 24 | 2.69 | 0.9 | 2.3 | 51.30 | 10.35 | 16.54 | 5.86 | 0.248 |
| 10 | 5.84 | 0.8 | 3.3 | 50.50 | 10.26 | 28.50 | 4.85 | 0.244 |
| 28 | 1.59 | 0.8 | 1.0 | 52.18 | 9.67 | 10.96 | 6.17 | 0.243 |

Figure 14:
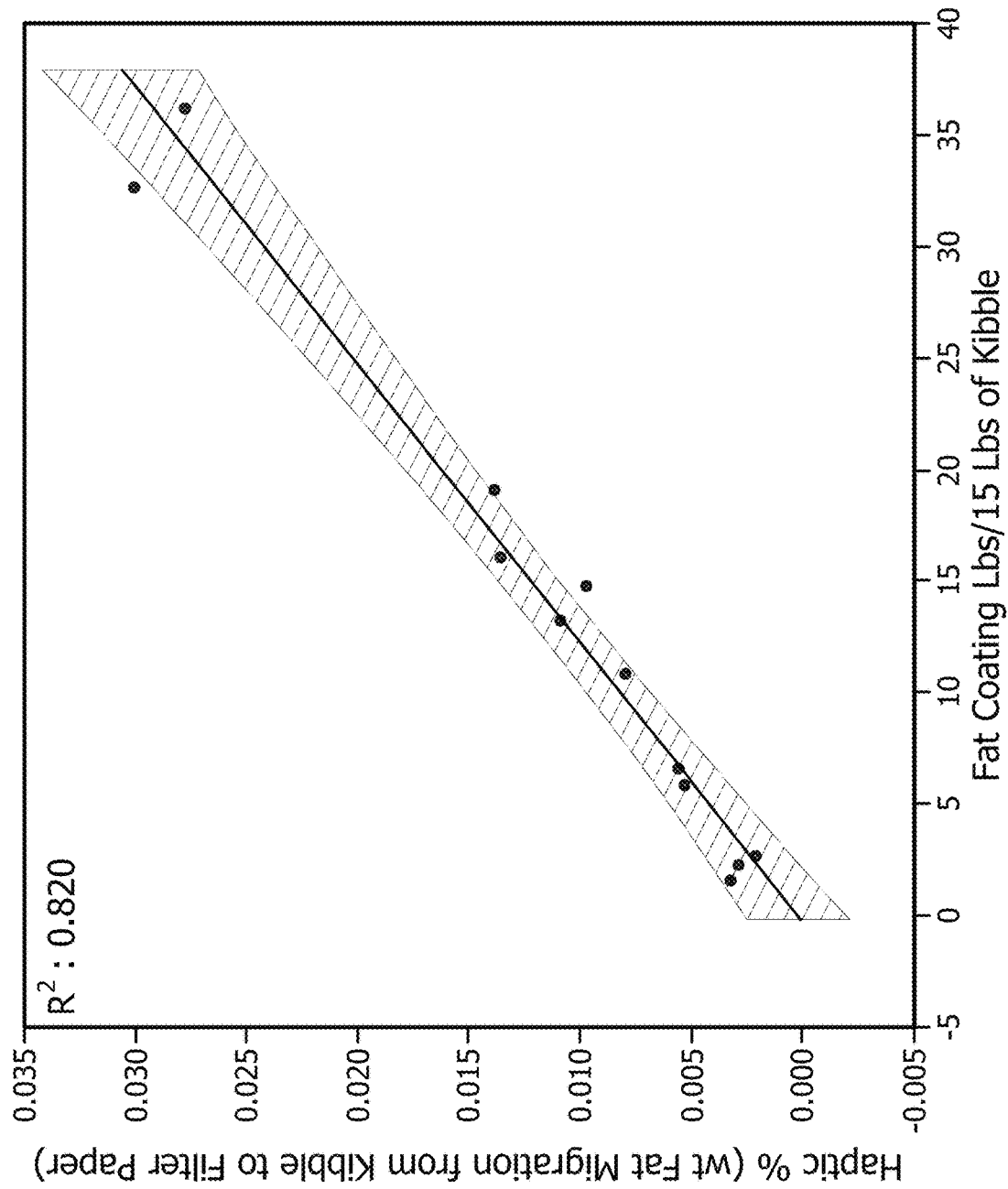
FIG. 14 graphically depicts that fat migration (absorption) from the porous product to filter paper in a haptic test is directly related to the amount of fat infused by vacuum infusion into the porous matrix.
Figure 15:
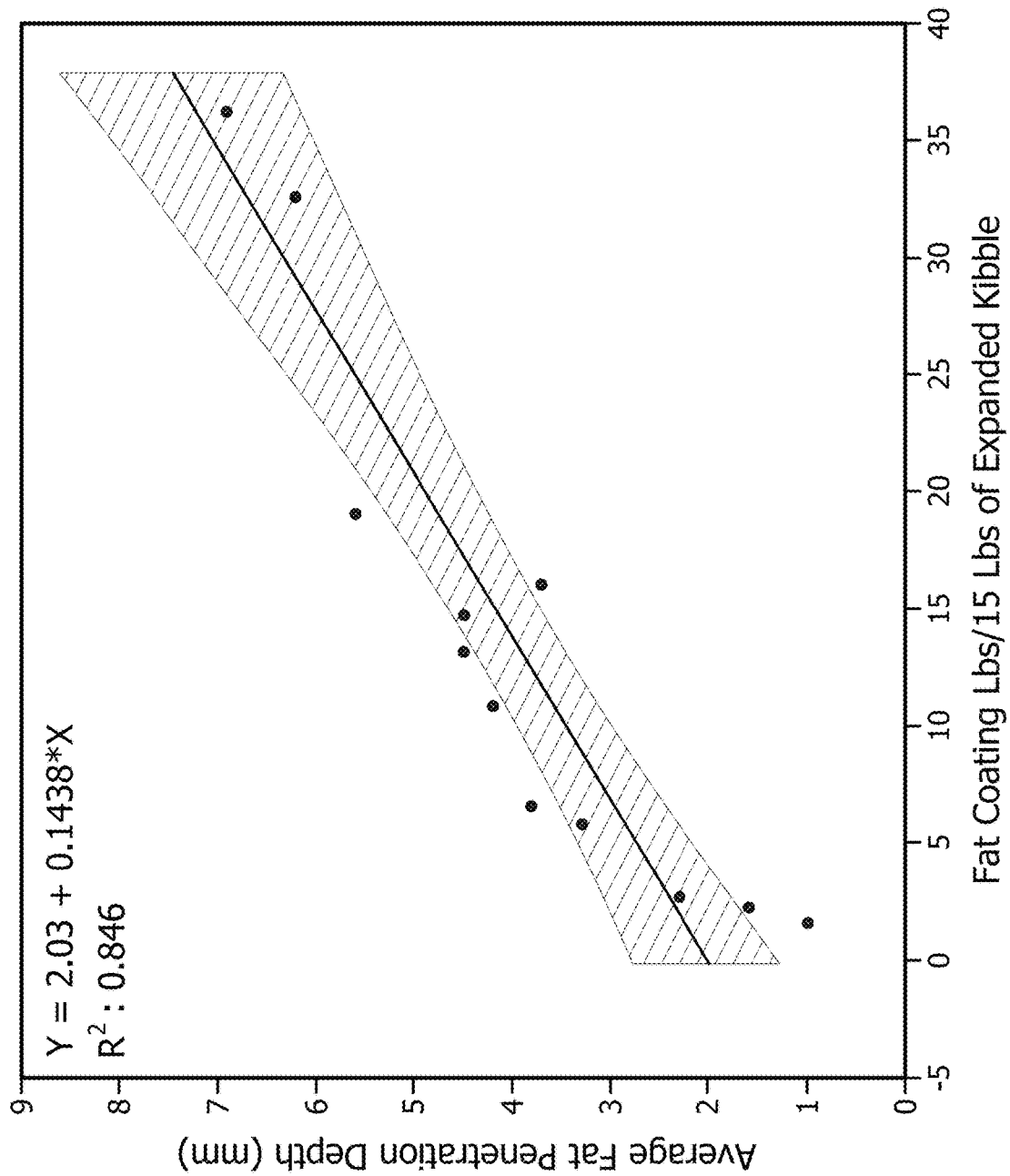
FIG. 15 graphically depicts a direct relationship between the average flowable fat penetration depth (mm) and volume into a porous matrix having a skeletal structure comprising rice starch.
Figure 18:
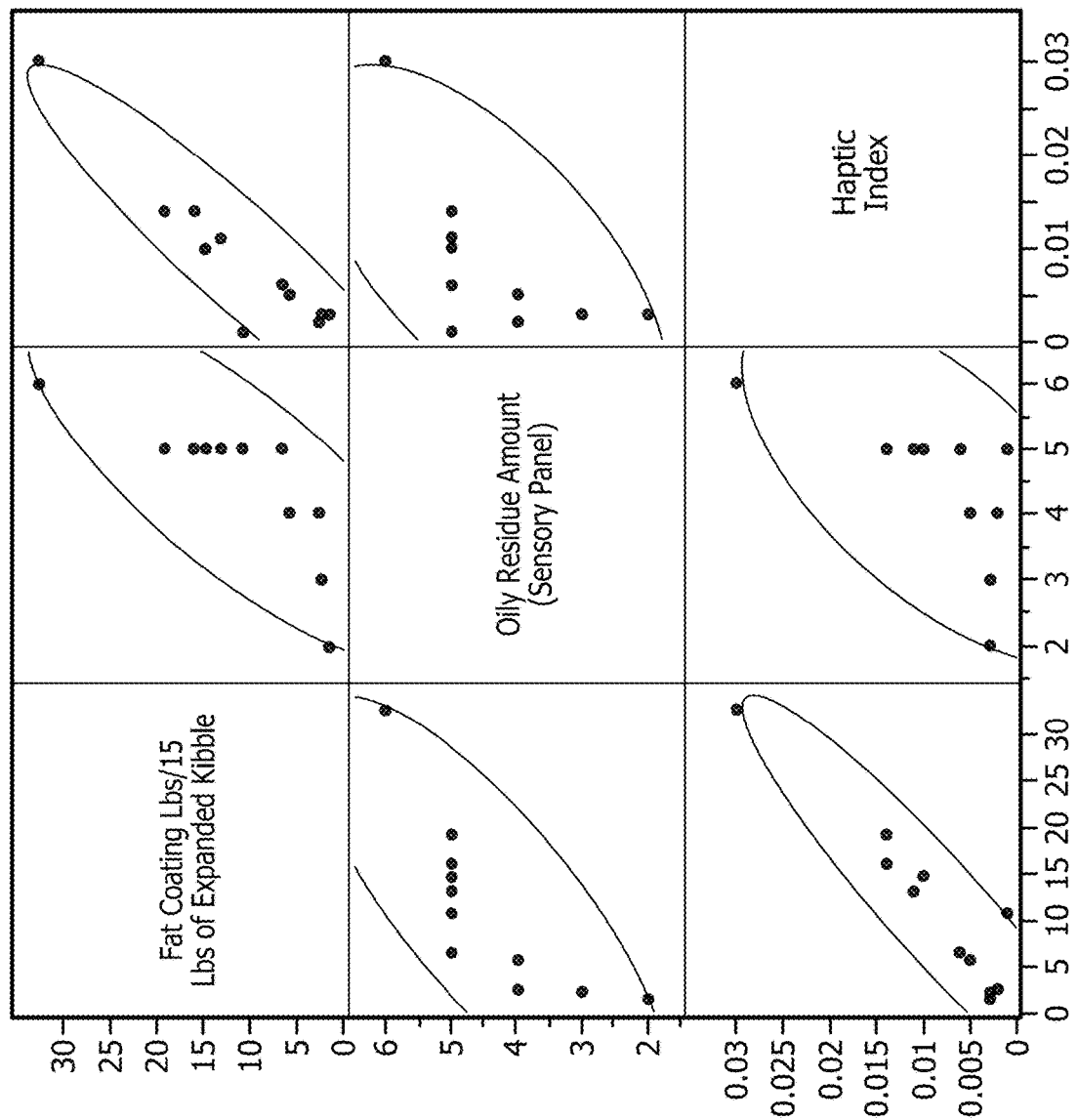
FIG. 18 graphically depicts a haptic index for oily residue that migrates to the filter paper during migration testing.
Figure 19:
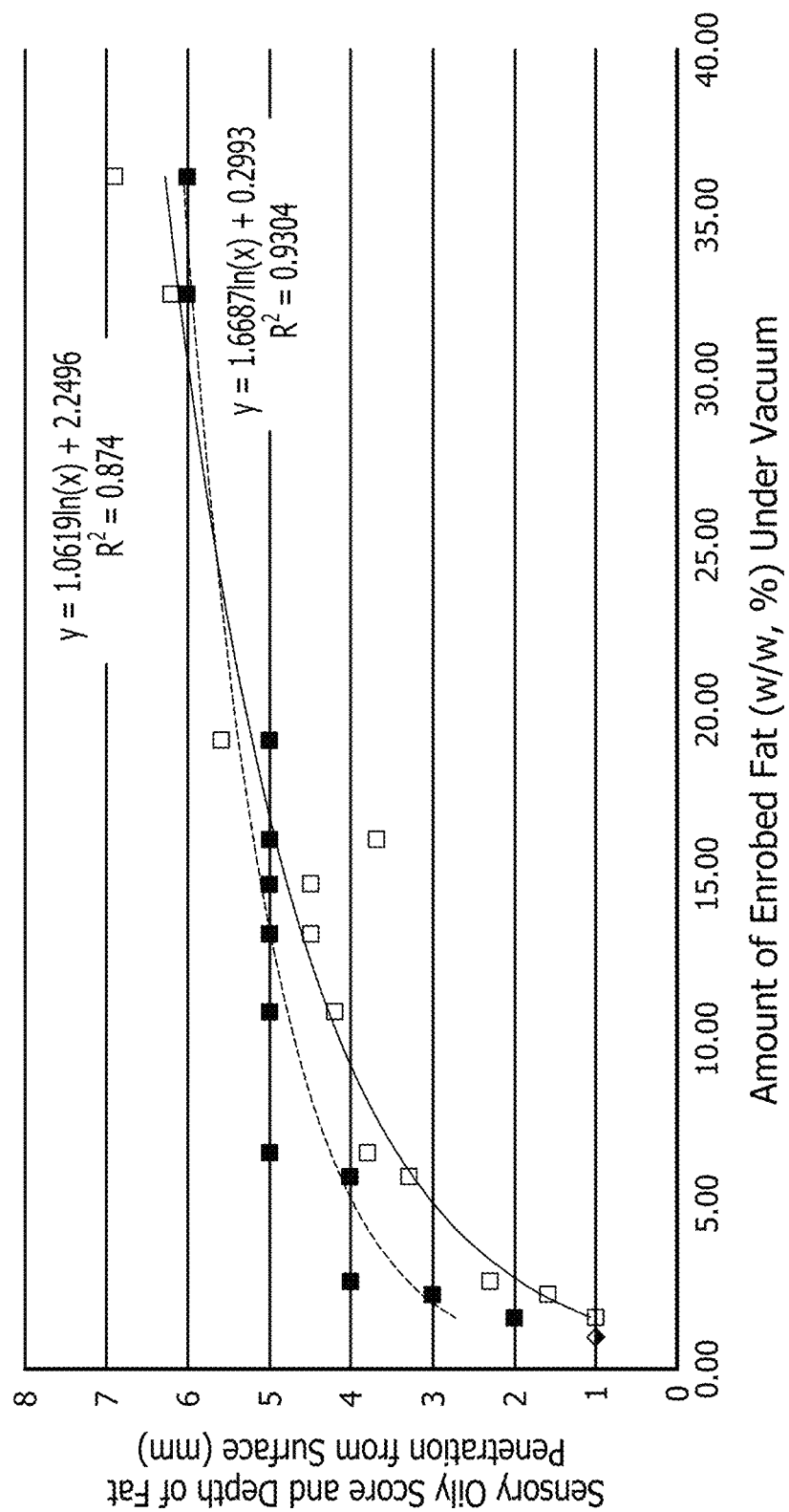
FIG. 19 graphically depicts the haptic oily residue amount (■ oily residue amount—sensory trained panel; □ average coating penetration depth (mm)) as the function of enrobed fat in relationship to the penetration of flowable fat into the porous matrix during vacuum infusion.

Referring now to FIGS. 14, 18, and 19, the expanded food product, while high in fat by weight and volume, exhibited crispness, as assessed by the number of measurable sound peaks, similar to expanded cereal and snacks, which are widely recognized as crisp/crunchy foods. In comparison, however, commercial cat treats exhibited higher density when compressed in the texture analyzer under force and speed conditions used to measure cereal and the expanded food products. During testing, the commercial cat treats did not break under the force and did not yield any measurable sound as shown on Table 13.

TABLE 13

Comparative Audible Sound Peak Test Data for Expanded Food Product and Commercial Products

| Sample Description | Fat in Tested Product (w/w, %) | No. of sound peaks | Texture analysis Peak area (N.sec) |
|---|---|---|---|
| Vacuum Infiltrated Expanded Food Product (brewers rice starch) | 62.23 | 207.30 | 48.29 |
|  | 52.94 | 206.09 | 45.77 |
|  | 49.84 | 204.67 | 48.50 |
|  | 69.73 | 203.91 | 43.52 |
|  | 46.25 | 203.22 | 42.88 |
|  | 46.82 | 193.11 | 46.53 |
|  | 30.38 | 191.70 | 49.94 |
|  | 40.74 | 188.00 | 49.02 |
|  | 16.54 | 184.60 | 47.73 |
|  | 28.50 | 181.09 | 51.39 |
|  | 13.37 | 177.11 | 49.57 |
|  | 10.96 | 173.70 | 56.01 |
| Cascadian Farm Purely O (human food) | n/a | 136.30 | 50.42 |
| Veganic Sprouted Brown Rice Crisp (human food) | n/a | 157.55 | 18.95 |
| Kix Crispy Corn Puffs-GMI (human food) | n/a | 102.30 | 45.15 |
| Chester's Puffcorn Cheese (human food) | n/a | 142.75 | 31.59 |
| Purina Whisker Lickin's (pet) | Not measurable | | Too hard exceeded instrument max testing force |
| Purina Friskies Party Mix Crunch Original (pet) | Not measurable | | Too hard exceeded instrument max testing force |
| Purina Friskies Party Mix Puffs Island Paradise (pet) | Not measurable | | Too hard exceeded instrument max testing force |
| Meow Mix Original Choice (pet) | Not measurable | | Too hard exceeded instrument max testing force |

The expanded food products were also tested to determine measurable haptic oily residue on the products as an amount of fat that wicks (or absorbs) from the products to a material. The test consisted of placing filter paper in clean Pyrex plates. The weight of the filter paper was measured to determine a baseline weight. Groups of 20 pieces of the expanded food product (rice-based) were weighed by group and then placed as groups of 20 onto the filter paper in each Pyrex plate. The Pyrex plates loaded with filter paper and the food products were placed in an oven set at about 35 degrees Celsius for 90 minutes. The Pyrex plates were removed from the oven after 90 minutes and each piece of filter paper and group of expanded food products were weighed to determine the mass gain for the filter paper and the mass loss for the expanded food products. In the calculation, the moisture loss for the filter paper was included with the measurements.

The testing showed that fat migration was directly related to the amount of fat present in the expanded food product. See FIGS. 14, 18, and 19. However, the fat migration from the expanded food product (with vacuum infused fat) to the filter paper was low. This shows that the expanded food product does not have a greasy surface to the touch or permit significant fat migration out of the porous matrix.

While the invention is described in conjunction with specific embodiments, many alternatives, modifications, permutations, and variations will become apparent to those skilled in the art in light of the foregoing description. Accordingly, it is intended that the invention embraces all such alternatives, modifications, permutations, and variations as falling within the scope of the claims of the invention.

The invention claimed is:

1. A pet food product comprising:
a porous matrix comprising:
starch at 70% or more by weight of the porous matrix; and
water from 2 to 12% by weight of the porous matrix;
flowable fat infused into the porous matrix at least at 30% by weight of the pet food product; and
a dry palatant coated on the pet food product at a ratio of dry palatant to flowable fat of 1:1 to 1:5.

2. The pet food product of claim 1 wherein the starch is selected from whole grains, broken grains, flours, roots, tubers, rice, brewer's rice, corn, barley, oats, wheat, potato, legumes, or other sources of biopolymers.

3. The pet food product of claim 1 wherein the pet food product further comprises one or more of vitamins, minerals, nutrients, colorants, preservatives, soluble fiber, insoluble fiber, sugar, antioxidants, enzymes, or probiotics.

4. The pet food product of claim 1 wherein the pet food product further comprises one or more of an orally active ingredient including one or more of a dental prophylactic ingredient, an anti-tartar agent, a breath agent, an anti-halitosis agent, a pharmaceutical agent, or a veterinary pharmaceutical agent.

5. The pet food product of claim 1 wherein the porous matrix comprises a porosity from 50 to 95% by total volume of the porous matrix.

6. The pet food product of claim 1 wherein the porous matrix comprises a plurality of intercommunicated pores defined by surfaces of the porous matrix and dispersed throughout the porous matrix and partially exposed through an outer surface of the porous matrix.

7. The pet food product of claim 6 wherein the surfaces of the porous matrix have a surface area from 0.2 to 0.7 m$^2$/g.

8. The pet food product of claim 1 wherein the porous matrix has a density from 30 to 80 lb/ft$^3$.

9. The pet food product of claim 1 wherein the pet food product has a bulk density from 4 to 12 lb/ft$^3$.

10. The pet food product of claim 1 having metabolizing energy (ME) in a range from 3 Kcal/g to 6 Kcal/g.

11. A pet food product comprising:
an expanded matrix comprising:
at least one starch at 70% or more by weight of the expanded matrix, the starch gelatinized from 50 to 100% by weight of the starch, and
a plurality of pores defined by surfaces of the expanded matrix and dispersed throughout the expanded matrix and a portion of the plurality of pores open through an external surface of the expanded matrix; and
one or more palatants incorporated into the expanded matrix and infiltrated into pores of the expanded matrix at 5% to 45% of weight of the pet food product.

12. The pet food product of claim 11 wherein the starch is selected from one or more of whole grains, broken grains, flours, roots, tubers, rice, brewer's rice, corn, barley, oats, wheat, potato, legumes, or other sources of biopolymers.

13. The pet food product of claim 11 wherein the pet food product further comprises one or more of vitamins, minerals, nutrients, colorants, preservatives, soluble fiber, insoluble fiber, sugar, antioxidants, enzymes, or probiotics.

14. The pet food product of claim 11 wherein the pet food product further comprises one or more of an orally active ingredient including one or more of a dental prophylactic ingredient, an anti-tartar agent, a breath agent, an anti-halitosis agent, a pharmaceutical agent, or a veterinary pharmaceutical agent.

15. The pet food product of claim 11 wherein the expanded matrix comprises a porosity from 50 to 95% by total volume of the expanded matrix.

16. The pet food product of claim 11 wherein the surfaces of the expanded matrix have a surface area from 0.2 to 0.7 $m^2/g$.

17. The pet food product of claim 11 wherein the expanded matrix has a density from 30 to 80 $lb/ft^3$.

18. The pet food product of claim 11 wherein the pet food product has a bulk density from 4 to 12 $lb/ft^3$.

19. The pet food product of claim 11 wherein the pet food product has metabolizing energy (ME) in a range from 3 Kcal/g to 6 Kcal/g.

\* \* \* \* \*